US012681579B2

(12) United States Patent　　　　(10) Patent No.:　US 12,681,579 B2
Kyung et al.　　　　　　　　　　　 (45) Date of Patent:　　　Jul. 14, 2026

(54) HAPTIC DEVICE PROVIDING LOCALIZED HAPTIC FEEDBACK AND CONTROLLING METHOD THEREOF

(71) Applicant: KOREA ADVANCED INSTITUTE OF SCIENCE AND TECHNOLOGY, Daejeon (KR)

(72) Inventors: Ki-Uk Kyung, Daejeon (KR); Jihwan Park, Daejeon (KR); Jaeseung Han, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 291 days.

(21) Appl. No.: 18/360,305

(22) Filed: Jul. 27, 2023

(65) Prior Publication Data

US 2024/0264674 A1　　　Aug. 8, 2024

(30) Foreign Application Priority Data

Feb. 7, 2023　　(KR) ........................ 10-2023-0016260

(51) Int. Cl.
G06F 3/01　　　　　(2006.01)
(52) U.S. Cl.
CPC ..................................... G06F 3/016 (2013.01)
(58) Field of Classification Search
CPC ...................................................... G06F 3/016
See application file for complete search history.

(56) References Cited

U.S. PATENT DOCUMENTS 8,803,822 B2　　8/2014　Bai et al.
9,436,284 B2　　9/2016　Hudin et al.
9,501,145 B2　　11/2016　Poupyrev et al.
(Continued)

FOREIGN PATENT DOCUMENTS

CN　　　　109101111 A　　12/2018
CN　　　　111521306 A　 * 　8/2020 ............. G01G 3/142
(Continued)

OTHER PUBLICATIONS

Cagatay Basdogan et al., "A Review of Surface Haptics: Enabling Tactile Effects on Touch Surfaces", IEEE Transactions on Haptics, 2020, pp. 1-21.
(Continued)

*Primary Examiner* — Quan Zhen Wang
*Assistant Examiner* — Mancil Littlejohn, Jr.
(74) *Attorney, Agent, or Firm* — Sughrue Mion, PLLC

(57)　　　　　　ABSTRACT
Provided are a haptic device providing localized haptic feedback and a controlling method thereof, wherein the haptic device includes a display, a haptic driving unit arranged on one surface of the display or inside the display, a signal controller, wherein the haptic driving unit includes a first panel, a second panel, a common electrode, and a plurality of electrode patterns, and the signal controller is configured to generate an output wave between the first panel and the second panel by outputting a voltage signal to the haptic driving unit, and provide at least one localized haptic feedback to the touch panel by controlling at least one of an amplitude and a phase of the voltage signal applied to each of the plurality of electrode patterns to overlap, reinforce, or interfere with the output wave.

18 Claims, 18 Drawing Sheets

(56)     References Cited

U.S. PATENT DOCUMENTS

| | | | |
|---|---|---|---|
| 9,572,531 B2 * | 2/2017 | Fukutani | A61B 5/489 |
| 9,996,199 B2 | 6/2018 | Park et al. | |
| 10,845,877 B2 | 11/2020 | Kim et al. | |
| 2012/0306790 A1 | 12/2012 | Kyung et al. | |
| 2014/0139328 A1 | 5/2014 | Zellers et al. | |
| 2016/0063826 A1 | 3/2016 | Morrell et al. | |
| 2017/0168572 A1 | 6/2017 | Peshkin et al. | |
| 2018/0175746 A1 | 6/2018 | Van Den Ende et al. | |
| 2018/0335846 A1 | 11/2018 | Toma et al. | |
| 2020/0159331 A1 | 5/2020 | Wen et al. | |
| 2020/0401228 A1 | 12/2020 | Wen et al. | |
| 2021/0165491 A1 | 6/2021 | Sun et al. | |

FOREIGN PATENT DOCUMENTS

| | | | | |
|---|---|---|---|---|
| JP | 2017-532648 A | 11/2017 | | |
| KR | 10-2016-0132828 A | 11/2016 | | |
| KR | 10-2018-0015708 A | 2/2018 | | |
| WO | WO-2018197894 A1 * | 11/2018 | | G06F 3/0416 |

OTHER PUBLICATIONS

Sebastian Wockel et al., "Effective modeling of elastic waves for haptic surface interaction", Proceedings of the 23rd International Congress on Acoustics, Sep. 9 to 13, 2019, pp. 993-999, Aachen, Germany.

Jihwan Park et al., "Electrostatic Haptic Panel for Localized Vibrotactile Feedback", AsiaHaptics 2020, Nov. 11, 2022, pp. 1-4, Beijing, China.

Korean Office Action dated Oct. 28, 2025, issued in Korean application No. 10-2023-0016260.

* cited by examiner

HAPTIC DEVICE PROVIDING LOCALIZED HAPTIC FEEDBACK AND CONTROLLING METHOD THEREOF

CROSS-REFERENCE TO RELATED APPLICATION

This application is based on and claims priority under 35 U.S.C. § 119 to Korean Patent Application No. 10-2023-0016260, filed on Feb. 7, 2023, in the Korean Intellectual Property Office, the disclosure of which is incorporated by reference herein in its entirety.

BACKGROUND

1. Field

The disclosure relates to a haptic device providing localized haptic feedback and a controlling method thereof.

2. Description of the Related Art

Haptic devices may provide users with haptic feedback, that is, tactile feedback, such as vibrations. When the users apply touch inputs to touch screens of the haptic devices, the haptic devices may provide haptic feedback onto surfaces of the touch screens. The haptic devices may include driving units such as motors and piezoelectric elements to provide haptic feedback. The driving units may be arranged adjacent to the touch screens of the haptic devices.

The haptic devices may detect touch inputs at any positions on the touch screens. The haptic devices may generate control signals for providing haptic feedback at any positions where touch inputs are detected. The haptic devices may provide haptic feedback at target positions for a certain period of time by using the control signals.

SUMMARY

Additional aspects will be set forth in part in the description which follows and, in part, will be apparent from the description, or may be learned by practice of the presented embodiments of the disclosure.

According to an aspect of the disclosure, a haptic device providing localized haptic feedback includes a display including a display panel and a touch panel, a haptic driving unit arranged on one surface of the display or inside the display, and a signal controller electrically connected to the haptic driving unit. The haptic driving unit may include a first panel, a second panel arranged to face the first panel, a common electrode arranged on the first panel, and a plurality of electrode patterns arranged on the second panel. The signal controller of the haptic device may be configured to generate an output wave between the first panel and the second panel by outputting a voltage signal to the haptic driving unit. The signal controller may provide at least one localized haptic feedback to the touch panel by controlling at least one of an amplitude and a phase of the voltage signal applied to each of the plurality of electrode patterns to overlap, reinforce, or interfere with the output wave.

According to another aspect of the disclosure, a controlling method of a haptic device includes an operation of generating an output wave between a first panel of a haptic driving unit and a second panel arranged to face the first panel by outputting a voltage signal to the haptic driving unit of the haptic device. The controlling method may include an operation of providing at least one localized haptic feedback to a touch panel of the haptic device by controlling at least one of an amplitude and a phase of the voltage signal applied to each of a plurality of electrode patterns arranged on the second panel to overlap, reinforce, or interfere with the output wave.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
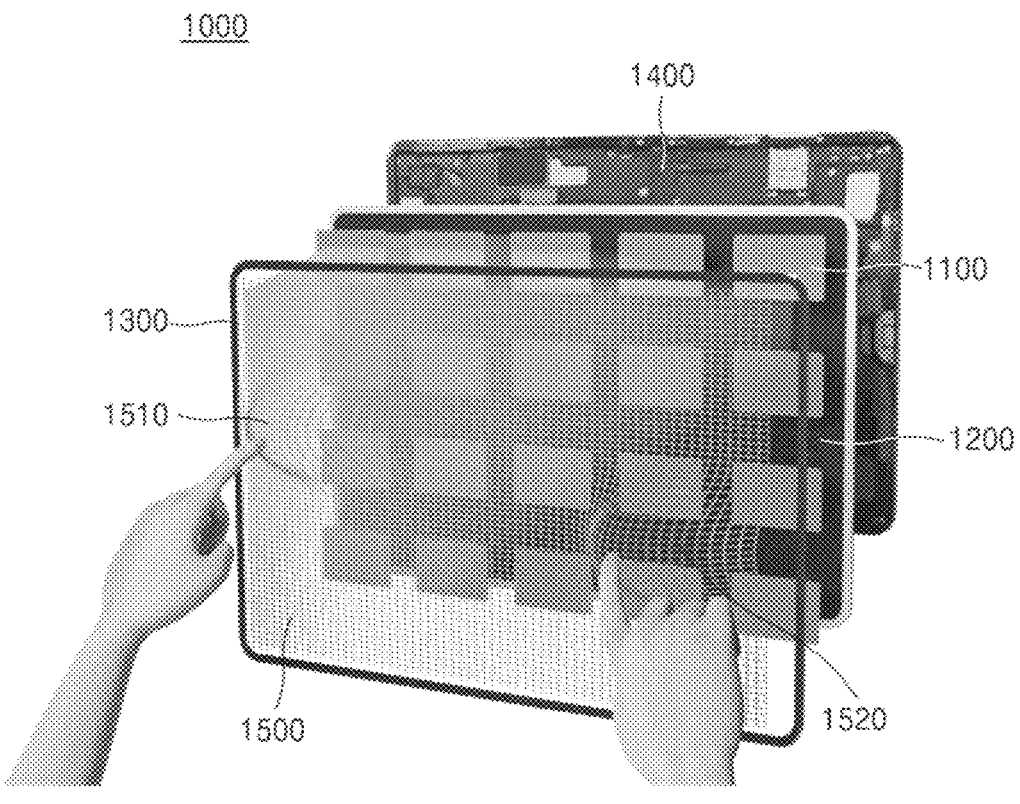
FIG. 1 is a view illustrating a haptic device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Terms used herein will be briefly described, and an embodiment will be described in detail.

The terms used herein have been selected as currently widely used general terms as much as possible while considering functions in an embodiment, but they may vary depending on the intention or precedent of those skilled in the art, the emergence of new technologies, and the like. In addition, in certain cases, there are terms arbitrarily selected by the applicant, and in this case, the meaning thereof will be described in detail in the description of embodiments. Therefore, the terms used herein should be defined based on the meanings of the terms and the general contents of the disclosure, not just the names of the terms.

In the disclosure, the expression "at least one of a, b, and c" may refer to "a", "b", "c", "a and b", "a and c", "b and c", "all of a, b, and c", or modifications thereof.

When a component "comprises" another component throughout the disclosure, this means that other components may be further included rather than excluding the other components unless specifically stated otherwise. In addition, the terms " . . . unit", "module", etc. described herein refer to units that process at least one function or operation, which may be implemented as hardware or software, or as a combination of hardware and software.

Hereinafter, embodiments will be described in detail with reference to the accompanying drawings so that those skilled in the art may easily implement the disclosure. However, an embodiment may be implemented in various different forms and is not limited to the embodiments described herein. In addition, in order to clearly describe an embodiment in the drawings, components unrelated to the description are omitted, and like reference numerals denote like elements throughout the disclosure.

An existing haptic device includes a driving unit including components having a preset thickness, such as a motor and a piezoelectric element, and thus, a thickness of the existing haptic device increases. The driving unit of the existing haptic device has a preset shape, and thus, a touch screen on which the driving unit is arranged may not easily implemented as a flexible display or a foldable display. Accordingly, the driving unit of the existing haptic device may not be easily applied to a mobile display device having a small thickness, or may not be easily applied to a flexible display device or a foldable display device having various form factors.

In addition, a control signal generated by the existing haptic device includes an impulse signal and thus provides an instantaneous or temporary haptic feedback to any position. The control signal generated by the existing haptic device may not easily and locally provide a static state haptic feedback to any position. Accordingly, the existing haptic device may not easily continuously provide a stable localized haptic feedback to a target location.

Provided are a haptic device for providing a localized haptic feedback, which may have a small thickness and be implemented in various forms and thus may be easily applied to a display device, and a controlling method thereof.

Provided are a haptic device for continuously providing a stable localized haptic feedback to a target position by locally providing a static state haptic feedback to any position, and a controlling method thereof.

Figure 2:
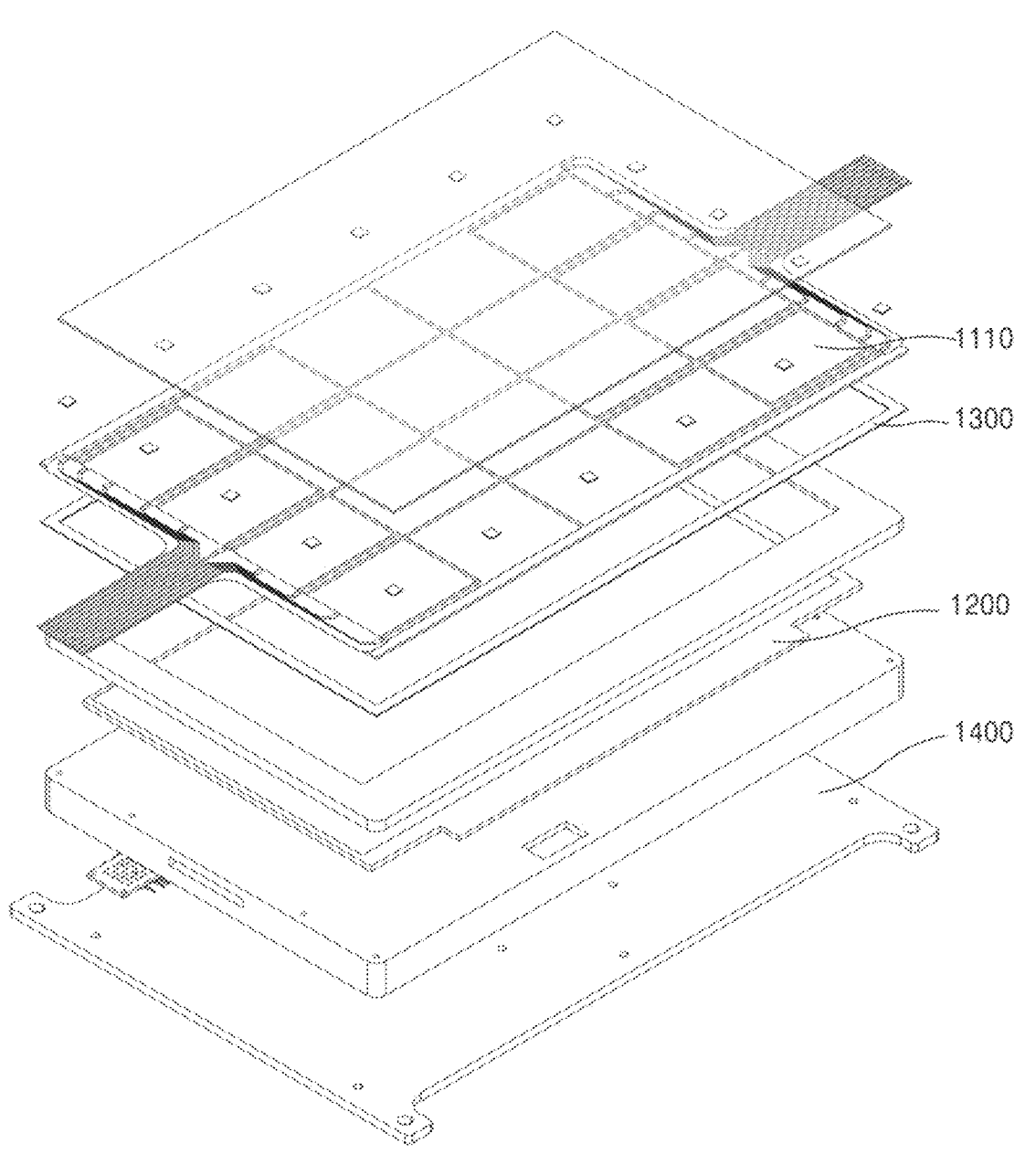
FIG. 2 is a view illustrating a haptic device according to an embodiment.

FIG. 1 is a view illustrating a haptic device 1000 according to an embodiment. FIG. 2 is a view illustrating the haptic device 1000 according to an embodiment. The haptic device 1000 according to an embodiment may include display 1200 and 1300, a haptic driving unit 1100, and a signal controller 1400. The display 1200 and 1300 may include a display panel 1200 and a touch panel 1300.

The haptic driving unit 1100 may be arranged on one surface of the display 1200 and 1300 or inside the display 1200 and 1300. For example, as illustrated in FIG. 1, the haptic driving unit 1100 may be arranged between the display panel 1200 and the touch panel 1300 constituting the display 1200 and 1300, but is not limited thereto. For example, the haptic driving unit 1100 may also be arranged on a rear surface of the display 1200 and 1300. For example, the haptic driving unit 1100 may be arranged on a front surface of the display 1200 and 1300. When the haptic driving unit 1100 is arranged on the front surface of the display 1200 and 1300, the haptic driving unit 1100 may be formed of a transparent material.

In an embodiment, the haptic driving unit 1100 may generate a vibration output. The haptic driving unit 1100 may receive a voltage signal from the signal controller 1400. The voltage signal may be a voltage input to the haptic driving unit 1100 in the form of an alternating current (AC). For example, the voltage signal may be a voltage in the form of a sine wave, which is input to the haptic driving unit 1100. The haptic driving unit 1100 may generate the vibration output to correspond to the voltage signal. For example, the haptic driving unit 1100 may generate a vibration output having an intensity corresponding to an amplitude of the voltage signal. For example, the haptic driving unit 1100 may generate the vibration output having a frequency corresponding to a frequency of the voltage signal. For example, the haptic driving unit 1100 may generate the vibration output having a phase corresponding to a phase of the voltage signal.

The display 1200 and 1300 may display an image and receive a touch input of a user. The display 1200 and 1300 may include the display panel 1200 for displaying an image and the touch panel 1300 for receiving a touch input of the user.

In an embodiment, the display 1200 and 1300 may include a bezel region in which a display driver integrated circuit (DDI) for processing image data is arranged and an active region in which pixels for displaying an image are arranged. For example, the display 1200 and 1300 may be liquid crystal display (LCD), organic light emitting diode display (OLED), micro LED, or quantum-dot display.

In an embodiment, the display panel 1200 may output an image that is visually provided to the user by the haptic device 1000. The image provided by the haptic device 1000 may include an image for guiding a user to a touch input and a haptic feedback corresponding to the touch input. For example, the image provided by the haptic device 1000 may include a guide object that guides the user to touch a particular position and guides that a vibration occurs when the particular position is touched.

In an embodiment, the touch panel 1300 may include at least one touch electrode for receiving a touch input of the user and a touch driving circuit that processes the touch input received through the touch electrode. The touch panel 1300 may have an add on type structure or an on-cell type structure. The haptic device 1000 according to an embodiment may have a touch-integrated structure in which the touch panel 1300 is arranged inside the display panel 1200. For example, the haptic device 1000 may have a Y-octa structure in which a touch electrode of the touch panel 1300 is deposited on a thin file encapsulation (TFE) layer of the display panel 1200.

The signal controller 1400 may be electrically connected to the haptic driving unit 1100. For example, the signal controller 1400 may be disposed on a printed circuit board (PCB) electrically connected to the haptic driving unit 1100. The signal controller 1400 may be an integrated circuit, a chip, or a module electrically connected to the haptic driving unit 1100.

In an embodiment, the signal controller 1400 may apply a voltage signal to the haptic driving unit 1100. The signal controller 1400 may generate an electric field inside the haptic driving unit 1100. An electrostatic force may be generated inside the haptic driving unit 1100 by the electric field. The signal controller 1400 may generate an output wave 1500 by vibrating the haptic driving unit 1100 on the basis of the generated electrostatic force. The voltage signal applied by the signal controller 1400 may be an AC voltage. A frequency band of the voltage signal may be a frequency band greater than or equal to about 0.1 Hz or less than or equal to about 1000 Hz, in which a human body senses a vibration with a tactile sense. The haptic driving unit 1100 may generate the output wave 1500 having a frequency band corresponding to the frequency band of the voltage signal. When a magnitude of a vibration generated by the output wave 1500 generated by the haptic driving unit 1100 is greater than or equal to a threshold value of the tactile sense of the human body, the user may receive a haptic feedback by the output wave 1500.

In an embodiment, the signal controller 1400 may control at least one of the amplitude and the phase of the voltage signal applied to the haptic driving unit 1100. The signal controller 1400 may reinforce and interfere with the output wave 1500 generated by the voltage signal by controlling the voltage signal. When the voltage signal is controlled, waveforms constituting the output wave 1500 may be superimposed, be reinforced, and interfere with. The signal controller 1400 may provide at least one localized haptic feedback 1510 and 1520 to the touch panel 1300 by reinforcing and interfering with the output wave 1500. For example, when touch inputs of the user are received at two points on the touch panel 1300, the haptic device 1000 may set, as a first target position and a second target position, respectively, the points at which the touch inputs are detected on the touch panel 1300. The signal controller 1400 may generate the output wave 1500, and may reinforce and interfere with the generated output wave 1500 to provide the first localized haptic feedback 1510 at the first target position and provide the second localized haptic feedback 1520 at the second target position.

Figure 3:
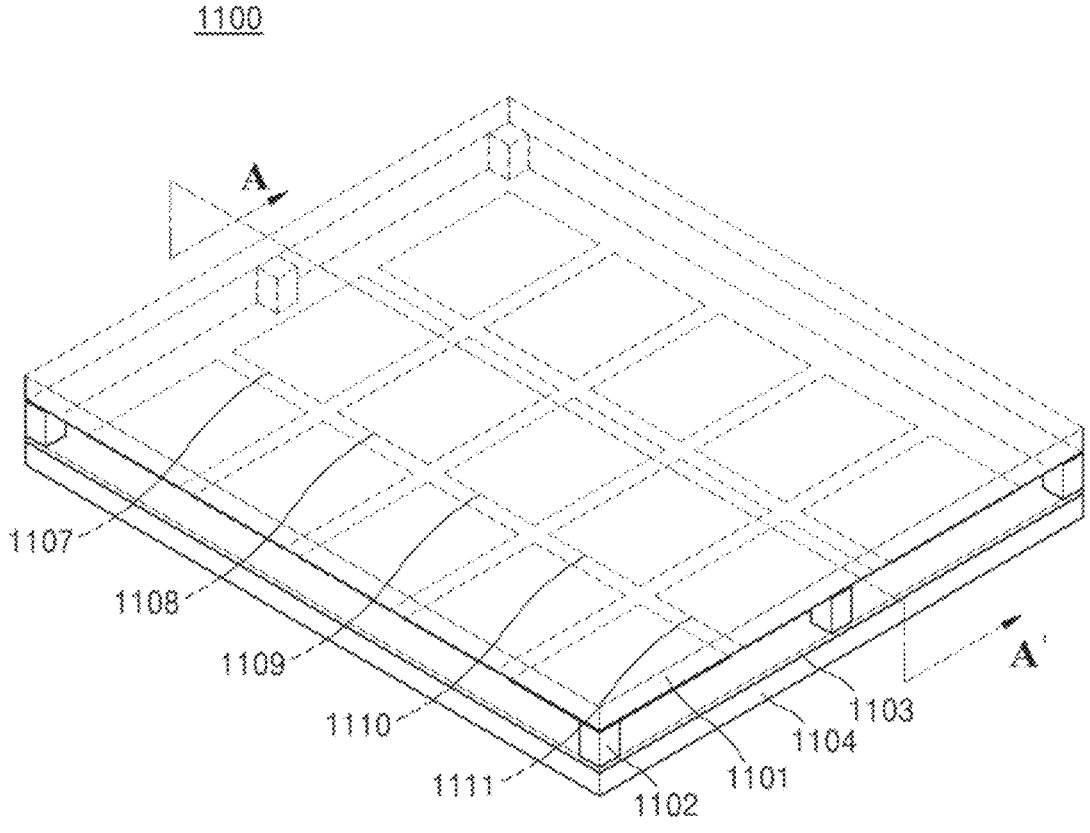
FIG. 3 is a view illustrating a haptic driving unit of a haptic device, according to an embodiment.
Figure 4:
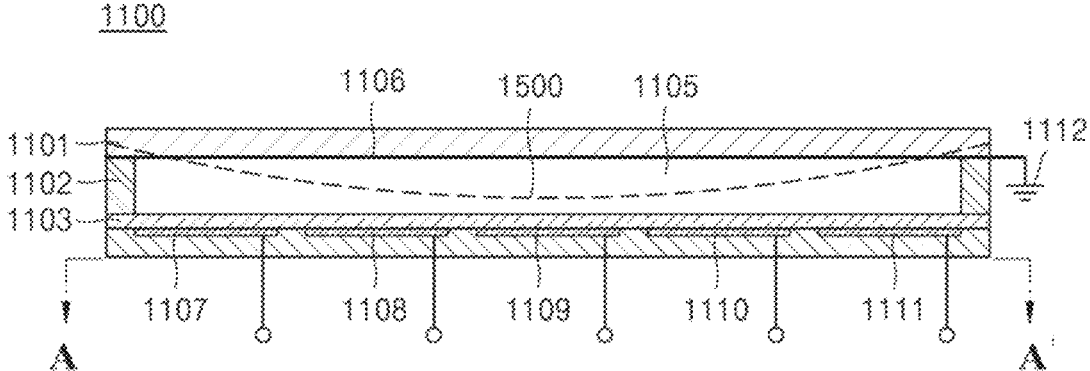
FIG. 4 is a cross-sectional view illustrating a haptic driving unit according to an embodiment.

FIG. 3 is a view illustrating a haptic driving unit 1100 of the haptic device 1000, according to an embodiment. FIG. 4 is a cross-sectional view illustrating the haptic driving unit 1100 according to an embodiment. FIG. 4 is a cross-sectional view taken along line A-A' of FIG. 3. The haptic driving unit 1100 according to an embodiment may include a first panel 1101, a spacer 1102, an insulating layer 1103, a second panel 1104, a common electrode 1106, a plurality of electrode patterns 1107, 1108, 1109, 1110, and 1111, and a ground portion 1112. Although FIGS. 3 and 4 illustrate that five electrode patterns 1107, 1108, 1109, 1110, and 1111 are arranged in each row, the disclosure is not limited thereto, and the number of electrode patterns 1107, 1108, 1109, 1110, and 1111 may be greater or less than five according to a size of the haptic driving unit 1100 and a range of a localized vibration feedback to be implemented by the haptic driving unit 1100.

The first panel 1101 may be an upper panel. The second panel 1104 may be a lower panel. The second panel 1104 may be arranged to face the first panel 1101. The first panel 1101 and the second panel 1104 may be arranged to be parallel to each other.

In an embodiment, the first panel 1101 and the second panel 1104 may have a film-shaped structure. The first panel 1101 and the second panel 1104 may have a thickness within a preset range. For example, each of the first panel 1101 and the second panel 1104 may have a thickness that is greater than or equal to about 1 mm, or less than or equal to about 1.5 mm. The first panel 1101 and the second panel 1104 may be detachable from the display 1200 and 1300. For example, the first panel 1101 and the second panel 1104 may be detachable from the display panel 1200 or the touch panel 1300. An adhesive layer to be attached to the display 1200 and 1300 may be provided on surfaces of the first panel 1101 and the second panel 1104.

In an embodiment, the first panel 1101 and the second panel 1104 may be transparent. The first panel 1101 and the second panel 1104 may have a light transmittance that is greater than or equal to a threshold value. For example, the first panel 1101 and the second panel 1104 may include a glass, plastic, or polymer material having a light transmittance that is greater than or equal to a threshold value.

In an embodiment, the first panel 1101 and the second panel 1104 may have rigidity that is greater than or equal to a preset value. The rigidity, which is greater than or equal to the preset value, may be rigidity for preventing deformation of the first panel 1101 and the second panel 1104 due to contact with a finger of the user. For example, the first panel 1101 and the second panel 1104 may include a reinforced glass, reinforced plastic, or reinforced polymer material having rigidity that is greater than or equal to a preset value.

The common electrode 1106 may be arranged on the first panel 1101. For example, the common electrode 1106 may be arranged on a lower surface of the first panel 1101 in the form of a thin film. For example, the common electrode 1106 may be arranged on the lower surface of the first panel 1101 by using a sputtering process. The common electrode 1106 may include a material that is transparent and has electrical conductivity. For example, the common electrode 1106 may include indium tin oxide (ITO). The common electrode 1106 may be electrically connected to the ground portion 1112.

In an embodiment, the common electrode 1106 may have a ground voltage and may be used as a common ground electrode. For example, when the plurality of electrode patterns 1107, 1108, 1109, 1110, and 1111 have different voltages, the common electrode 1106 may operate as a reference ground for each of the plurality of electrode patterns 1107, 1108, 1109, 1110, and 1111, and may allow a potential difference to be formed between the common electrode 1106 and each of the plurality of electrode patterns 1107, 1108, 1109, 1110, and 1111.

The plurality of electrode patterns 1107, 1108, 1109, 1110, and 1111 may be arranged on the second panel 1104. The plurality of electrode patterns 1107, 1108, 1109, 1110, and 1111 may be patterned to be spaced apart from one another. For example, the common electrode 1106 may be disposed on an upper surface of the second panel 1104 in the form of a thin film electrode pattern. The plurality of electrode patterns 1107, 1108, 1109, 1110, and 1111 may include a material that is transparent and has electrical conductivity. For example, the plurality of electrode patterns 1107, 1108, 1109, 1110, and 1111 may include ITO. The plurality of electrode patterns 1107, 1108, 1109, 1110, and 1111 may be electrically connected to the signal controller 1400.

In an embodiment, the plurality of electrode patterns 1107, 1108, 1109, 1110, and 1111 may receive a voltage signal from the signal controller 1400. Each of the plurality of electrode patterns 1107, 1108, 1109, 1110, and 1111 may receive a voltage signal in the form of an AC. An electric field may be generated between the plurality of electrode patterns 1107, 1108, 1109, 1110, and 1111 that receive the voltage signals and the common electrode 1106. An electrostatic force may be generated on the basis of the electric field generated between the plurality of electrode patterns 1107, 1108, 1109, 1110, and 1111 and the common electrode 1106. The first panel 1101 may vibrate on the basis of the electrostatic force generated between the plurality of electrode patterns 1107, 1108, 1109, 1110, and 1111 and the common electrode 1106. An output wave 1500 may be generated when the first panel 1101 vibrates on the basis of the electrostatic force.

In an embodiment, the plurality of electrode patterns 1107, 1108, 1109, 1110, and 1111 may respectively receive voltage signals having different amplitudes and different phases. Electrostatic forces having different magnitudes and phases may be generated between the plurality of electrode patterns 1107, 1108, 1109, 1110, and 1111 and the common electrode 1106. For example, the voltage signal applied to each of the plurality of electrode patterns 1107, 1108, 1109, 1110, and 1111 may form a wave bent horizontally in a space 1105 between the first panel 1101 and the second panel 1104 by generating an independent electrostatic force. A vibration may be locally generated at a target location by controlling a shape of the output wave 1500 between each of the plurality of electrode patterns 1107, 1108, 1109, 1110, and 1111, and the common electrode 1106. The electrostatic force may generate the output wave 1500, which is non-linear, in proportion to the square of a voltage, and thus, the signal controller 1400 may generate the output wave 1500, which is linear, by applying a direct current (DC) voltage having a first amplitude and an AC voltage having a second amplitude that is less than the first amplitude. For example, the signal controller 1400 may generate an output wave having a target amplitude and phase at a target position and having an amplitude value of 0 at positions other than the targe position by controlling the amplitude and phase of the voltage signal applied to each of the plurality of electrode patterns 1107, 1108, 1109, 1110, and 1111 to overlap, reinforce, or interfere with the output wave 1500.

The spacer 1102 may be arranged between the first panel 1101 and the second panel 1104. For example, the spacer 1102 may be arranged between a corner portion of the first panel 1101 and a corner portion of the second panel 1104. The spacer 1102 may have a pillar shape. For example, the spacer 1102 may have a rectangular pillar shape. The spacer 1102 may space the first panel 1101 and the second panel 1104 apart from each other. The space 1105 may be formed between the first panel 1101 and the second panel 1104 by the spacer 1102.

In an embodiment, the spacer 1102 may be attached to the first panel 1101 and the second panel 1104. For example, the spacer 1102 may include a polymer material having a property of being attached to the first panel 1101 and the second panel 1104. The spacer 1102 may have an elastic force changing a length, width, height, or volume by a physical force applied from the outside. For example, the spacer 1102 may include a polymer material having an elastic force that is greater than or equal to a preset value.

The insulating layer 1103 may be disposed on an upper surface of the second panel 1104. The insulating layer 1103 may be formed to have a thickness within a preset range. For example, the insulating layer 1103 may be coated on the upper surface of the second panel 1104. The insulating layer 1103 may prevent an electrical breakdown among the plurality of electrode patterns 1107, 1108, 1109, 1110, and 1111. The insulating layer 1103 may be formed of a transparent material. The insulating layer 1103 may be formed of a material having a dielectric constant that is greater than or equal to a threshold value. For example, the insulating layer 1103 may include polyethylene terephthalate (PET).

The signal controller 1400 may generate the electric field between the common electrode 1106 and the plurality of electrode patterns 1107, 1108, 1109, 1110, and 1111, on the basis of the voltage signal output to each of the plurality of electrode patterns 1107, 1108, 1109, 1110, and 1111. The electrostatic force may be generated by the electric field generated between the common electrode 1106 and the plurality of electrode patterns 1107, 1108, 1109, 1110, and 1111. The signal controller 1400 may generate the output wave 1500 between the first panel 1101 and the second panel 1104 by vibrating the first panel 1101 on the basis of the electrostatic force.

The haptic driving unit 1100 according to an embodiment may have a film shape in which the common electrode 1106 and the plurality of electrode patterns 1107, 1108, 1109, 1110, and 1111 are thinly arranged on each of two transparent and thin panels (e.g., the first panel 1101 and the second panel 1104). The signal controller 1400 according to an embodiment may generate an electrostatic force between the common electrode 1106 and the plurality of electrode patterns 1107, 1108, 1109, 1110, and 1111 by applying a voltage signal to the plurality of electrode patterns 1107, 1108, 1109, 1110, and 1111, and thus, the haptic device 1000 having a film shape, based on the electrostatic force, may be provided. Accordingly, the haptic device 1000 according to an embodiment may be operated by an electrostatic method by arranging the electrodes patterns 1106, 1107, 1108, 1109, 1110, and 1111 on each of the two transparent and thin panels (e.g., the first panel 1101 and the second panel 1104). Accordingly, the haptic device 1000 according to an embodiment may be implemented in various forms, and thus may be easily applied to various types of display devices such as a mobile display device, a flexible display device, and a foldable display device. In addition, the haptic device 1000 and a controlling method thereof according to an embodiment may generate a localized static state vibration by controlling the voltage signal applied to each of the electrode patterns 1106, 1107, 1108, 1109, 1110, and 1111 to reinforce and interfere with the output wave 1500. Accordingly, the haptic device 1000 and the controlling method thereof according to an embodiment may continuously provide stable localized haptic feedbacks 1510 and 1520 to a target position.

Figure 5:
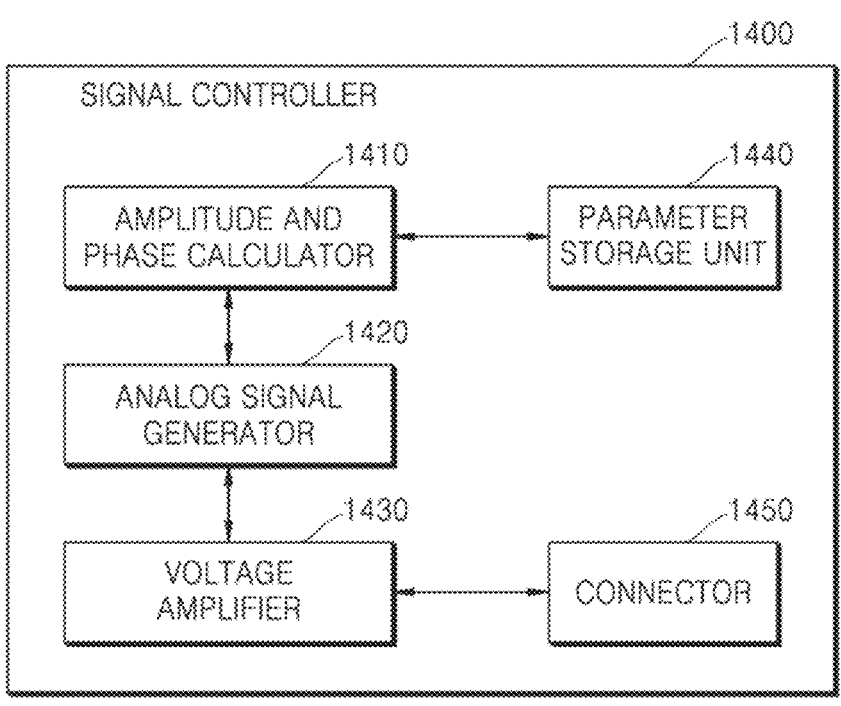
FIG. 5 is a block diagram illustrating a signal controller of a haptic device, according to an embodiment.

FIG. 5 is a block diagram illustrating a signal controller 1400 of the haptic device 1000, according to an embodiment. The signal controller 1400 according to an embodiment may include an amplitude and phase calculator 1410, an analog signal generator 1420, a voltage amplifier 1430, a parameter storage unit 1440, and a connector 1450.

The amplitude and phase calculator 1410 may calculate an amplitude and phase of a voltage signal applied to the plurality of electrode patterns 1107, 1108, 1109, 1110, and 1111 by the signal controller 1400. The amplitude and phase calculator 1410 may calculate an amplitude and phase of a voltage signal to be applied to generate the output vibration to be targeted. The amplitude and phase calculator 1410 may include an operation processing device. For example, the amplitude and phase calculator 1410 may include a micro controller unit (MCU). The amplitude and phase calculator 1410 may have an operation processing speed that is greater than or equal to a preset speed. Accordingly, the amplitude and phase calculator 1410 may calculate an amplitude and phase of a voltage signal for a time within a preset range. For example, the amplitude and phase calculator 1410 may calculate the amplitude and phase of the voltage signal for a time greater than or equal to about 0.1 ms or less than or equal to about 1 ms.

The analog signal generator 1420 may generate an analog waveform corresponding to the amplitude and phase of the voltage signal calculated by the amplitude and phase calculator 1410. The analog signal generator 1420 may include a circuit for generating an analog waveform. For example, the analog signal generator 1420 may include a digital-to-analog converter (DAC), a pulse width modulator (PWM), or a direct digital synthesizer (DDS) circuit.

The voltage amplifier 1430 may amplify the analog waveform into a voltage signal. The voltage amplifier 1430 may amplify the analog waveform into a voltage signal having a size capable of driving the haptic driving unit 1100. The voltage amplifier 1430 may include an amplifier circuit capable of amplifying the analog waveform to a high voltage having a size within a preset range. For example, the voltage amplifier 1430 may include a flyback transformer or a cockcroft-Walton voltage multiplier.

The parameter storage unit 1440 may store parameter data used to calculate the amplitude and phase of the voltage signal by the amplitude and phase calculator 1410. The parameter data may include physical values including a frequency, position, intensity, and radius of the output vibration to be targeted. The parameter data may include at least one equation for calculating a voltage signal to be applied to generate the output vibration 1500. For example, the parameter storage unit 1440 may include read only memory (ROM) or flash memory for storing parameter data.

The connector 1450 may supply the voltage signal amplified by the voltage amplifier 1430 to each of the plurality of electrode patterns 1107, 1108, 1109, 1110, and 1111. The connector 1450 may electrically connect the signal controller 1400 to the haptic driving unit 1100. For example, the connector 1450 may be a PCB connector that electrically connects the signal controller 1400 to the haptic driving unit 1100.

In an embodiment, the signal controller 1400 may control a voltage signal applied to the haptic driving unit 1100 such that the haptic driving unit 1100 generates the output wave 1500 providing a localized haptic feedback to a target position. The amplitude and phase calculator 1410 may calculate an amplitude and phase of the voltage signal for generating the output wave 1500 that provides a localized haptic feedback. The amplitude and phase calculator 1410 may calculate the amplitude and phase by using the parameter data stored in the parameter storage unit 1440. The amplitude and phase calculator 1410 may transmit the calculated amplitude and phase to the analog signal generator 1420. The analog signal generator 1420 may generate an analog waveform on the basis of the amplitude and phase. The voltage amplifier 1430 may boost the analog waveform to a voltage signal having a size capable of driving the haptic driving unit 1100. The connector 1450 may supply the boosted voltage signal to each of the plurality of electrode patterns 1107, 1108, 1109, 1110, and 1111. Accordingly, the signal controller 1400 may apply, to the haptic driving unit 1100, the voltage signal for generating the output wave 1500 that provides the localized haptic feedback.

Figure 6:
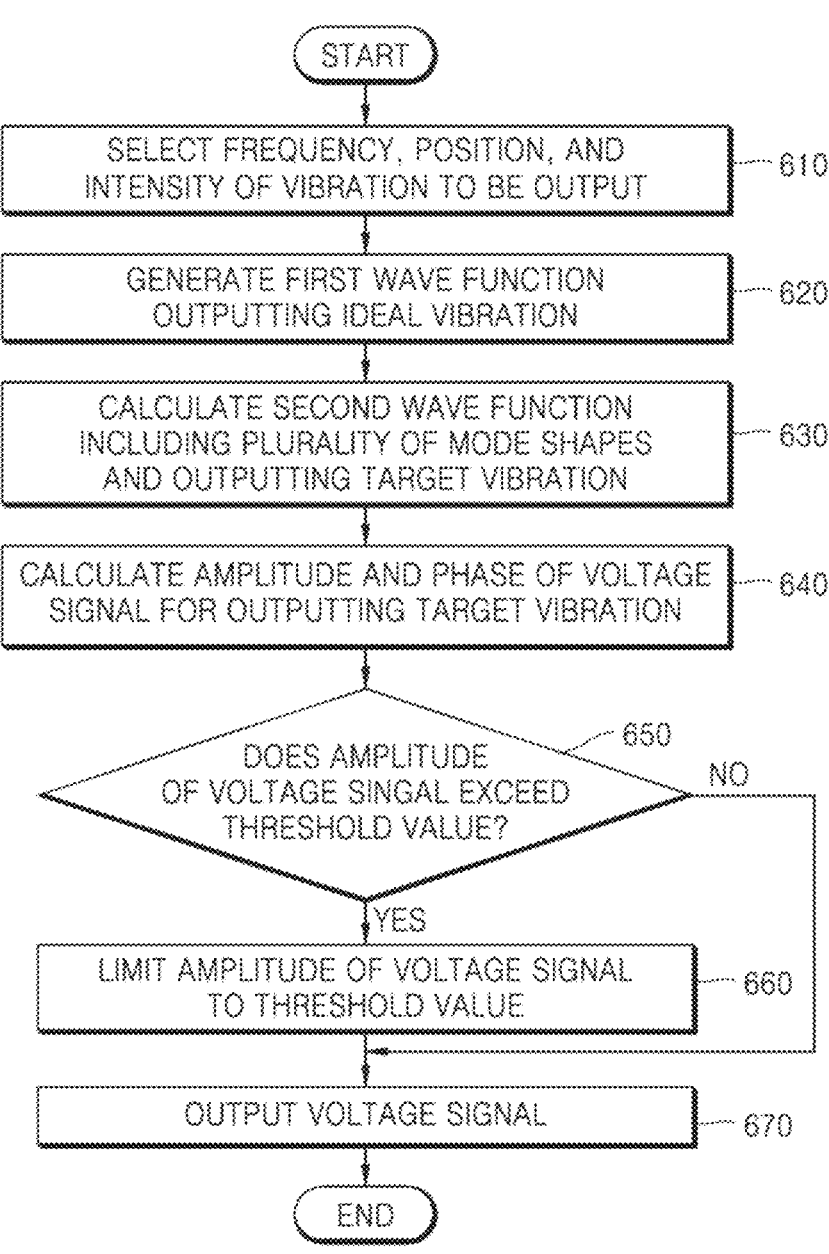
FIG. 6 is a flowchart illustrating a controlling method of a haptic device, according to an embodiment.

FIG. 6 is a flowchart illustrating a controlling method of the haptic device 1000, according to an embodiment.

In operation 610, the signal controller 1400 of the haptic device 1000 according to an embodiment may select a frequency, position, and intensity of a vibration to be output. The amplitude and phase calculator 1410 of the signal controller 1400 may select a frequency, position, intensity, and radius of the output wave 1500 for providing a localized haptic feedback to a target position by the haptic driving unit 1100. For example, the signal controller 1400 may set a first frequency of the output wave 1500. For example, the signal controller 1400 may set a first target position to which a localized haptic feedback is provided by a vibration due to the output wave 1500. For example, the signal controller 1400 may set a first intensity of the output wave 1500 at the first target position. For example, the signal controller 1400 may set a first radius of the output wave 1500 around a first target position.

In operation 620, the signal controller 1400 of the haptic device 1000 according to an embodiment may generate a first wave function that outputs an ideal vibration. The amplitude and phase calculator 1410 of the signal controller 1400 may generate a first wave function that mathematically defines the output wave 1500 for providing a localized haptic feedback. The first wave function $A(x,y)$ may be defined as in Equation 1 below.

$$A(x, y) = A_{max} \frac{\sin(\pi d/r1)}{\pi d/r1} \exp\left(-(d/r1)^2\right) \qquad \text{[Equation 1]}$$

$A(x1, y1)$ may be a value of a first wave function at the first target position $P1(x1, y1)$ at which an x-coordinate is x1 and a y-coordinate is y1. Amax may be a maximum value of the first wave function, and may be a value of $A(x1, y1)$. d may be a distance from the first target position $P1(x1, y1)$ to a random point $P(x, y)$. The first wave function may be expressed as a function obtained by multiplying an exponential function and a triangular function. Accordingly, the first wave function may have a maximum value at the first target position $P1(x1, y1)$, may have a size decreasing away from the first target position $P1(x1, y1)$, and may have a value of 0 at each distance preset from the first target position $P1(x1, y1)$.

In an embodiment, the amplitude and phase calculator 1410 may express the first wave function as an acceleration output function expressed by values at i points (wherein i is a natural number greater than or equal to 2) spaced apart from each other. The acceleration output function may be defined as in Equation 2 below.

$$\tilde{A}(j\omega) = \left[A(x_{N1}, y_{N1}), A(x_{N2}, y_{N2}), \ldots, A(x_{N_i}, y_{N_i})\right]^T \qquad \text{[Equation 2]}$$

In operation 630, the signal controller 1400 of the haptic device 1000 according to an embodiment may calculate a second wave function that includes a plurality of mode shapes and outputs a target vibration. The mode shapes may be matrix values to which mathematically assumed pseudo-inverse operators may be applied. The amplitude and phase calculator 1410 of the signal controller 1400 may decompose the acceleration output function into the plurality of mode shapes. For example, the amplitude and phase calculator 1410 may express the acceleration output function as a sum of N mode shapes (wherein N is a natural number greater than or equal to 2) and express the acceleration output function as a matrix function. The second wave function including the plurality of mode shapes may be defined as in Equation 3 below.

$$A*(j\omega) = \Psi\Psi^\dagger\tilde{A}(j\omega) \qquad \text{[Equation 3]}$$

A*(jω) may be a target acceleration output function. The actual implementation of an ideal acceleration output function may not be easy, and thus, the amplitude and phase calculator 1410 may calculate an amplitude and phase of a voltage signal by using the target acceleration output function. Ψ may be a mode shape matrix. † may be a mathematically assumed pseudo-inverse operator.

In operation 640, the signal controller 1400 of the haptic device 1000 according to an embodiment may calculate the amplitude and phase of the voltage signal for outputting a target vibration. The amplitude and phase calculator 1410 of the signal controller 1400 may calculate a function indicating a voltage signal by applying a mathematically assumed pseudo-inverse function solution to the second wave function. For example, the amplitude and phase calculator 1410 may calculate the function indicating the voltage signal on the basis of a singular value decomposition method. The function indicating the voltage signal may be defined as in Equation 4 below.

$$V*(j\omega) = H_{va}^\dagger(j\omega)A*(j\omega) \qquad \text{[Equation 4]}$$

$H_{va}$ may be a transfer matrix between an acceleration output and a voltage signal input to the haptic driving unit 1100.

$$H_{va}^\dagger$$

may be an inverse function obtained by mathematically assuming the transfer matrix. V*(jω) may be a voltage signal input to the haptic driving unit 1100 to output a target acceleration.

In operation 650, the signal controller 1400 of the haptic device 1000 according to an embodiment may identify whether or not the amplitude of the voltage signal exceeds a threshold value. The amplitude and phase calculator 1410 of the signal controller 1400 may transmit the calculated amplitude and phase to the analog signal generator 1420. The analog signal generator 1420 may generate an analog waveform on the basis of the amplitude and phase. The voltage amplifier 1430 may boost the analog waveform to a voltage signal having a size capable of driving the haptic driving unit 1100. Here, the voltage amplifier 1430 may identify whether or not the amplitude of the voltage signal applies overload or damage to the haptic driving unit 1100 including the plurality of electrode patterns 1107, 1108, 1109, 1110, and 1111. When the amplitude of the voltage signal exceeds the threshold value in operation 650, the voltage amplifier 1430 may proceed to operation 660. When the amplitude of the voltage signal is less than or equal to the threshold value in operation 650, the voltage amplifier 1430 may proceed to operation 670.

In operation 660, the signal controller 1400 of the haptic device 1000 according to an embodiment may limit the amplitude of the voltage signal to the threshold value. The voltage amplifier 1430 of the signal controller 1400 may adjust an amplification gain to limit the amplitude of the voltage signal to the threshold value.

In operation 670, the signal controller 1400 of the haptic device 1000 according to an embodiment may output the voltage signal. The connector 1450 of the signal controller 1400 may supply the voltage signal having the amplitude less than or equal to the threshold value to each of the plurality of electrode patterns 1107, 1108, 1109, 1110, and 1111.

Figure 7:
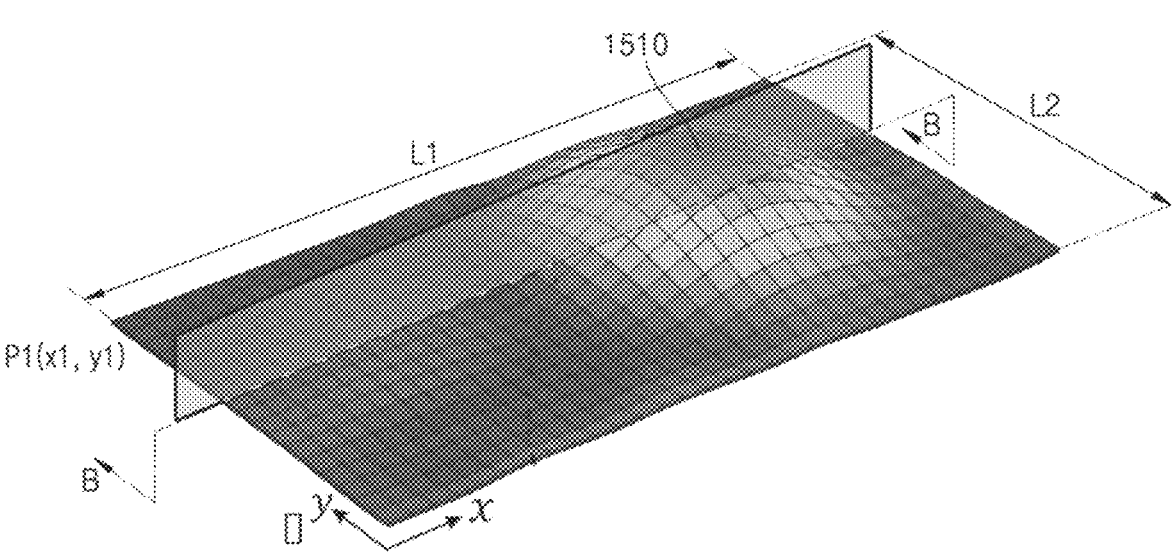
FIG. 7 is a view illustrating an output vibration of a haptic device, according to an embodiment.

FIG. 7 is a view illustrating the output vibration 1500 of the haptic device 1000, according to an embodiment.

The haptic driving unit 1100 of the haptic device 1000 according to an embodiment may be arranged on an xy plane. For example, the first panel 1101 and the second panel 1104 of the haptic driving unit 1100 may be arranged to be parallel to the xy plane. The first panel 1101 and the second panel 1104 may have a first length L1 in an x-axis direction. The first panel 1101 and the second panel 1104 may have a second length L2 in a y-axis direction. The first panel 1101 and the second panel 1104 may be transparent and have a thickness within a preset range. For example, the first panel 1101 and the second panel 1104 may include glass plates having the first length L1 of about 267 mm, the second length L2 of about 156.5 mm, and the thickness of about 1.1 mm. The plurality of electrode patterns 1107, 1108, 1109, 1110, and 1111 including a transparent material may be arranged on the second panel 1104 in a number appropriate for providing a localized vibration feedback. For example, a total of 20 electrode patterns 1107, 1108, 1109, 1110, and 1111 including ITO may be arranged on the second panel 1104 in four rows of five. FIG. 7 may illustrate the result of measuring, by using a laser Doppler vibrometer, an acceleration output for the form of occurrence of the output wave 1500 for providing a localized vibration feedback when driving the haptic device 1000 including the haptic driving unit 1100 actually manufactured according to an embodiment.

In an embodiment, the output wave 1500 may have a maximum value at the first target position P1(x1, y1) and have a value of 0 at positions other than the first target position P1(x1, y1). For example, the first target position P1(x1, y1) may be a position having a coordinate value of 180 mm and 80 mm. The haptic driving unit 1100 of the haptic device 1000 may provide a first localized haptic feedback 1510 at the first target position P1(x1, y1) by generating the output wave 1500. Accordingly, the haptic driving unit 1100 may continuously provide the stable first localized haptic feedback 1510 to the first target position P1(x1, y1).

Figure 8:
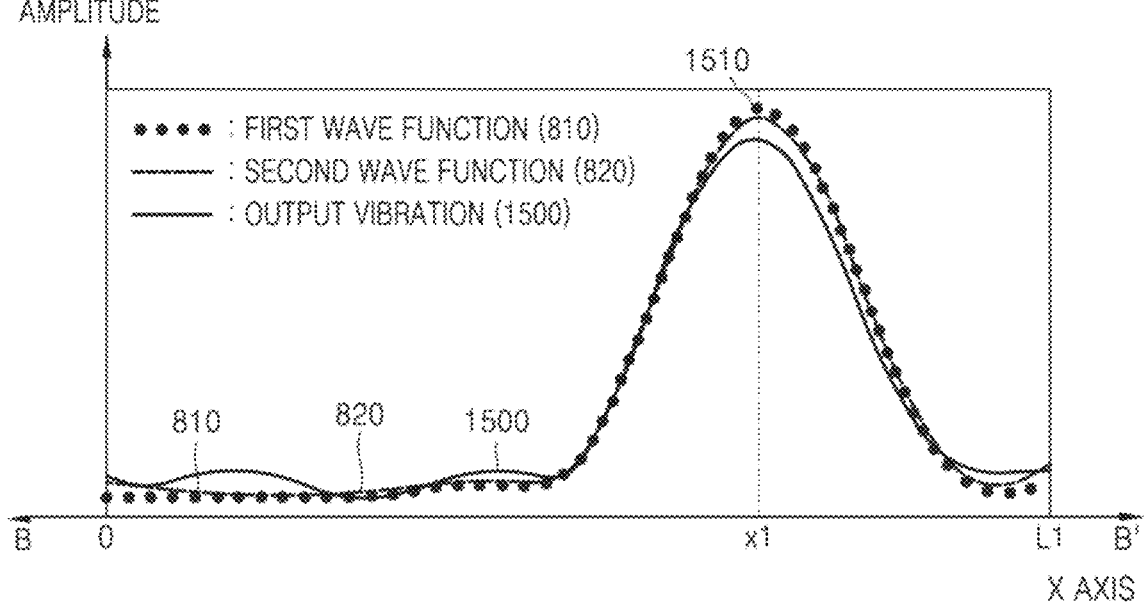
FIG. 8 is a graph illustrating an amplitude with respect to an x-axis indicating a first wave function, a second wave function, and an output vibration, according to an embodiment.

FIG. 8 is a graph illustrating an amplitude with respect to an x-axis indicating a first wave function 810, a second wave function 820, and an output vibration 1500, according to an embodiment. FIG. 8 is a graph illustrating a cross section taken along line B-B' of FIG. 7.

In an embodiment, the first wave function 810, the second wave function 820, and the output vibration 1500 may have values that have substantially no difference. Accordingly, the haptic driving unit 1100 may provide the first localized haptic feedback 1510 by generating the output vibration 1500 that is substantially the same as the first wave function 810 ideally providing the first localized haptic feedback 1510 to the first target position P1($x$1, $y$1).

Figure 9:
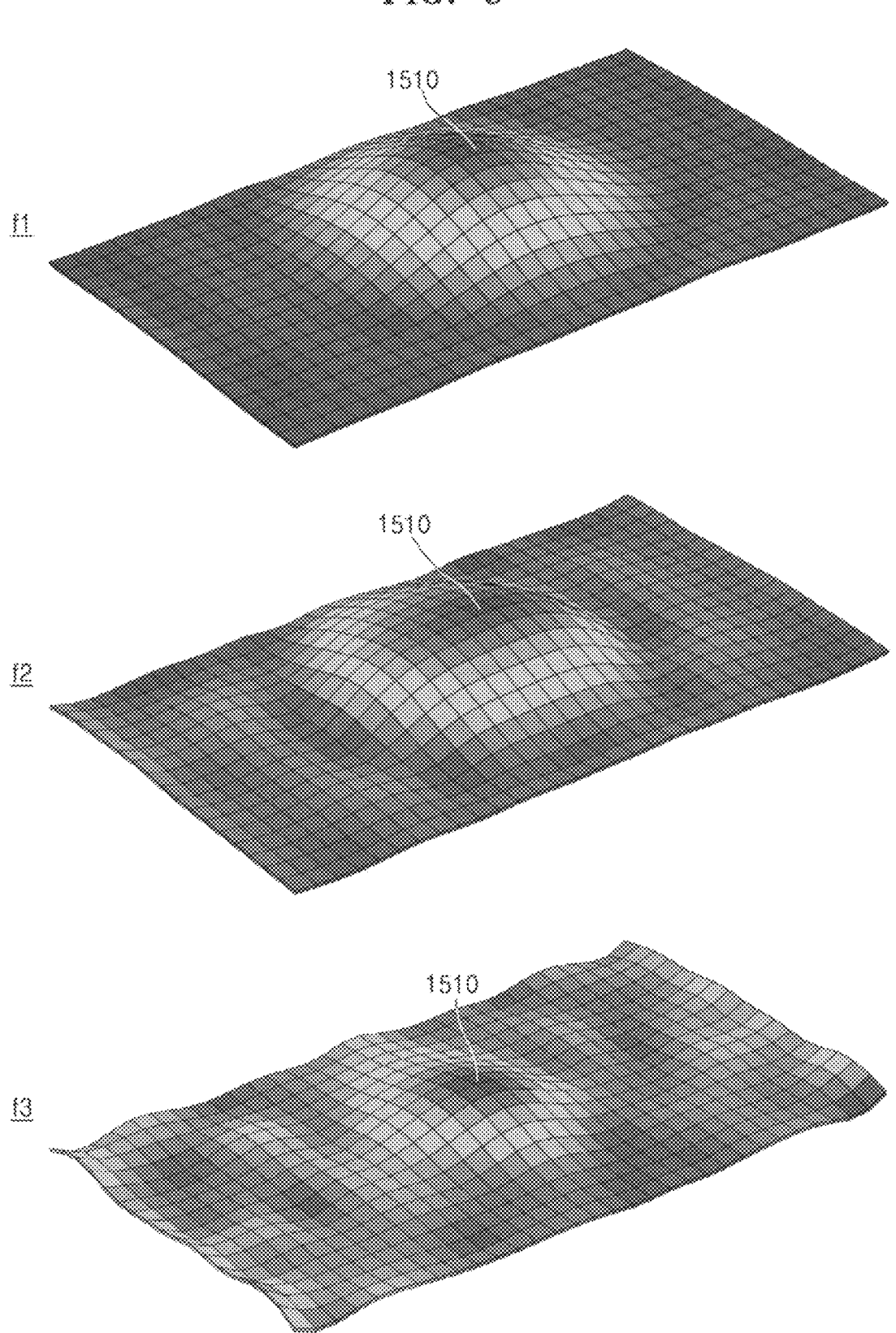
FIG. 9 is a view illustrating a change in first localized haptic feedback according to a frequency of an output vibration, according to an embodiment.

FIG. 9 is a view illustrating a change in a first localized haptic feedback 1510 according to a frequency of the output vibration 1500, according to an embodiment.

In an embodiment, the frequency of the output vibration 1500 may be adjusted to a first frequency f1, a second frequency f2 higher than the first frequency f1, and a third frequency f3 higher than the second frequency f2. For example, the frequency of the output vibration 1500 may be adjusted to the first frequency f1 of about 250 Hz, the second frequency f2 of about 750 Hz, and the third frequency f3 of about 1500 Hz. When the frequency of the output vibration 1500 increases, the degree of change in the output vibration 1500 according to a position may gradually change. Even when the frequency of the output vibration 1500 increases, the first target position P1($x$1, $y$1) at which the first localized haptic feedback 1510 occurs may be fixed. When the frequency of the output vibration 1500 increases, a waveform of the first localized haptic feedback 1510 may change to be more concentrated at the first target position P1($x$1, $y$1) or dispersed at the first target position P1($x$1, $y$1). Accordingly, the haptic driving unit 1100 may provide the first localized haptic feedback 1510 to the first target position P1($x$1, $y$1) to correspond to the frequency of the output vibration 1500.

Figure 10:
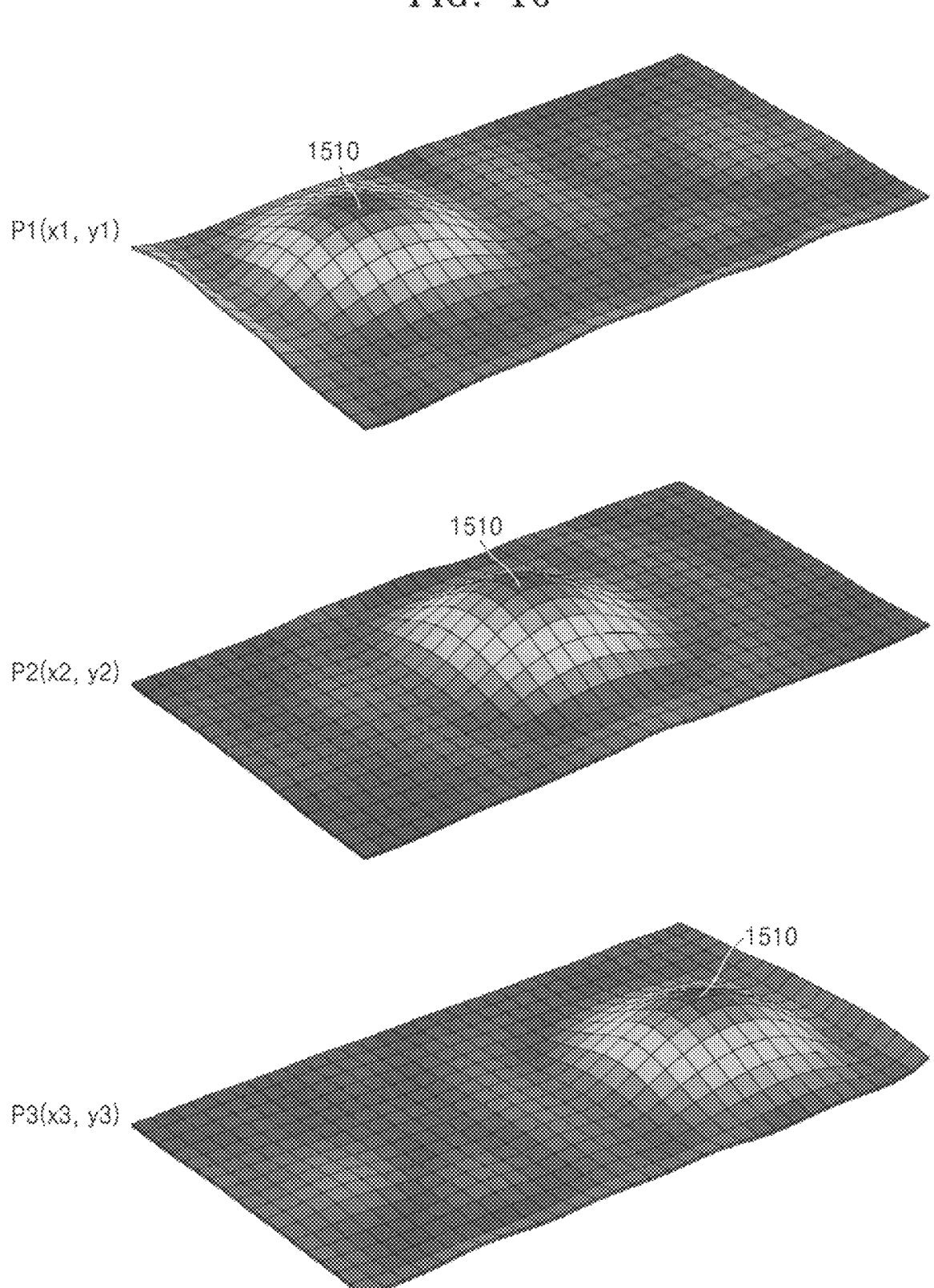
FIG. 10 is a view illustrating a change in output vibration according to a position of a first localized haptic feedback, according to an embodiment.

FIG. 10 is a view illustrating a change in output vibration 1500 according to a position of a first localized haptic feedback 1510, according to an embodiment.

In an embodiment, the position of the first localized haptic feedback 1510 may be adjusted to a first target position P1($x$1, $y$1), a second target position P2($x$2, $y$2), and a third target position P3($x$3, $y$3). For example, the position of the first localized haptic feedback 1510 may be adjusted to 60 mm, 90 mm, 130 mm, 80 mm, and 200 mm, 60 mm on an xy coordinate axis. When the position of the first localized haptic feedback 1510 is changed, the first localized haptic feedback 1510 may be provided around a changed target position. A waveform of the first localized haptic feedback 1510 at the target position may be maintained. Accordingly, the haptic driving unit 1100 may change the output vibration 1500 according to a target position to which the first localized haptic feedback 1510 is to be provided and provide the first localized haptic feedback 1510 to correspond to the changed target position.

Figure 11:
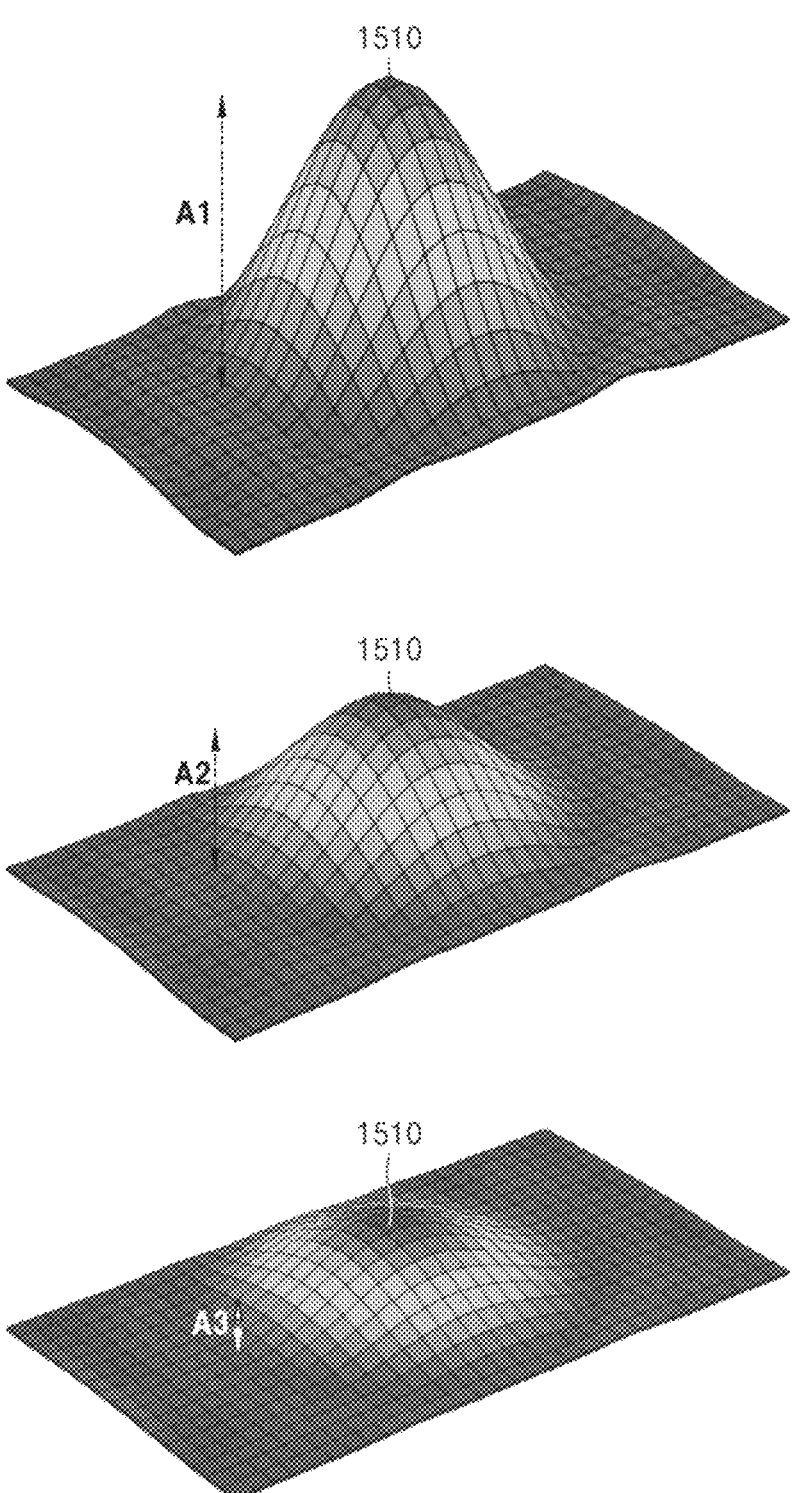
FIG. 11 is a view illustrating a change in output vibration according to an amplitude of a first localized haptic feedback, according to an embodiment.

FIG. 11 is a view illustrating a change in output vibration 1500 according to an amplitude of a first localized haptic feedback 1510, according to an embodiment.

In an embodiment, the amplitude of the first localized haptic feedback 1510 may be adjusted to a first amplitude A1, a second amplitude A2 less than the first amplitude A1, and a third amplitude A3 less than the second amplitude A2. For example, the amplitude of the first localized haptic feedback 1510 may be adjusted to about 4 m/s$^2$, about 2 m/s$^2$, and about 1 m/s$^2$. When wanting to change the amplitude of the first localized haptic feedback 1510, the signal controller 1400 may control the amplitude of the output vibration 1500 so that the amplitude of the first localized haptic feedback 1510 changes at a target position. For example, the signal controller 1400 may control the amplitude of the output vibration 1500 by changing an amplitude of a voltage signal applied to the haptic driving unit 100. Accordingly, the haptic driving unit 1100 may provide the first localized haptic feedback 1510 having an amplitude to be provided.

Figure 12:
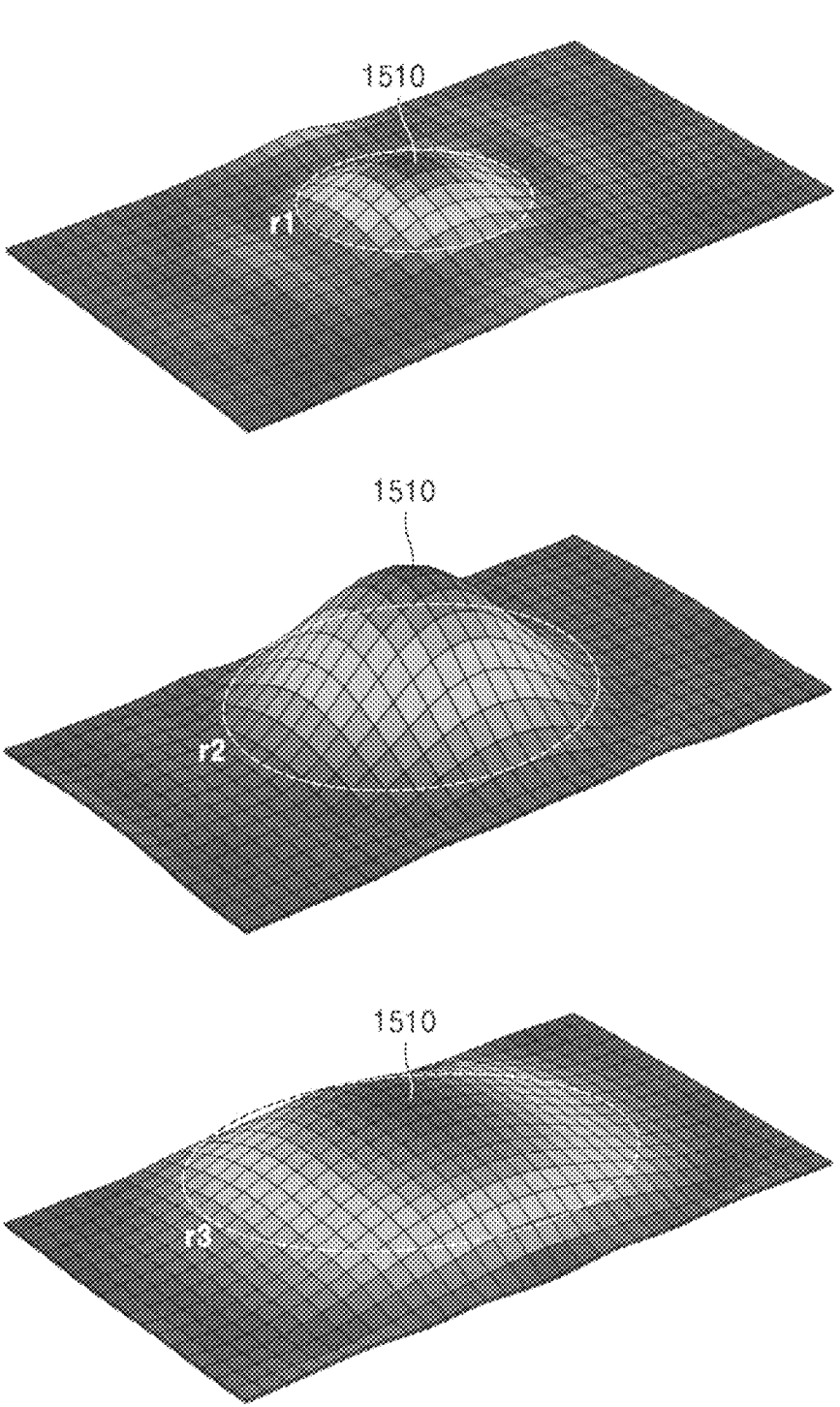
FIG. 12 is a view illustrating a change in output vibration according to a radius of a first localized haptic feedback, according to an embodiment.

FIG. 12 is a view illustrating a change in output vibration 1500 according to a radius of a first localized haptic feedback 1510, according to an embodiment.

In an embodiment, the radius of the first localized haptic feedback 1510 may be adjusted to a first radius r1, a second radius r2 greater than the first radius r1, and a third radius r3 greater than the second radius r2. For example, the radius of the first localized haptic feedback 1510 may be adjusted to about 40 mm, about 80 mm, and about 120 mm. When wanting to change the radius of the first localized haptic feedback 1510, the signal controller 1400 may control the output vibration 1500 so that the radius occupied by the first localized haptic feedback 1510 changes around a target position. Accordingly, the haptic driving unit 1100 may provide, around the target position, the first localized haptic feedback 1510 having a radius to be provided.

Figure 13:
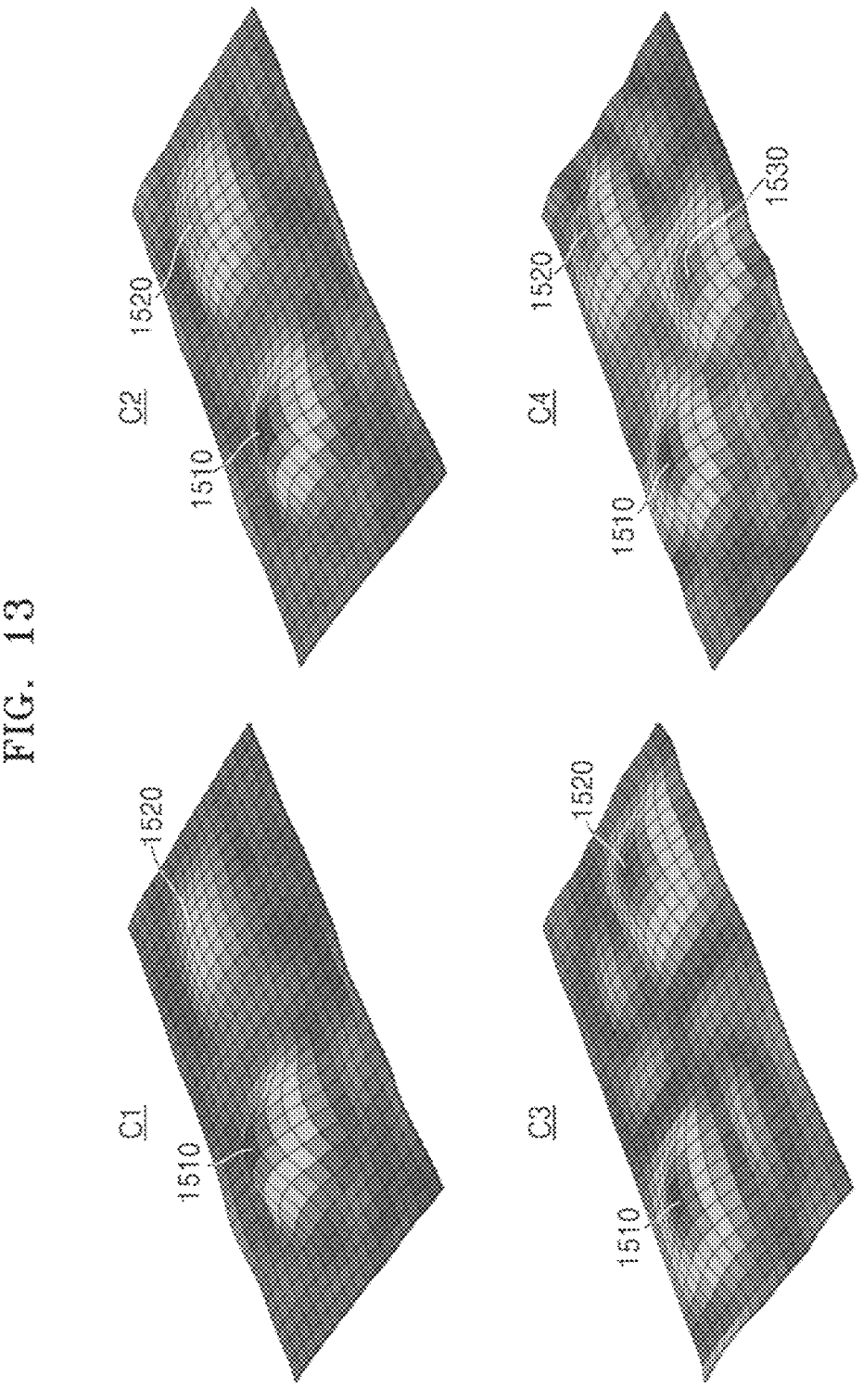
FIG. 13 is a view illustrating an output vibration including a plurality of localized haptic feedbacks, according to an embodiment.

FIG. 13 is a view illustrating the output vibration 1500 including a plurality of localized haptic feedbacks 1510, 1520, and 1530, according to an embodiment.

In an embodiment, as in a first case C1, a second case C2, and a third case C3, at least one localized haptic feedback 1510 and 1520 may include a first localized haptic feedback 1510 providing a first vibration at a first position and a second localized haptic feedback 1520 providing a second vibration at a second position that is different from the first position. For example, as in the first case C1 and the second case C2, the first localized haptic feedback 1510 may have a greater amplitude than the second localized haptic feedback 1520. For example, as in the third case C3, the first localized haptic feedback 1510 and the second localized haptic feedback 1520 may have substantially the same amplitude.

In an embodiment, as in a fourth case C4, at least one localized haptic feedback 1510, 1520, and 1530 may include a first localized haptic feedback 1510 providing a first vibration at a first position, a second localized haptic feedback 1520 providing a second vibration at a second position, and a third localized haptic feedback 1530 providing a third vibration at a third position. For example, as in the fourth case C4, the first localized haptic feedback 1510, the second localized haptic feedback 1520, and the third localized haptic feedback 1530 may have substantially the same amplitude. For example, the first localized haptic feedback 1510, the second localized haptic feedback 1520, and the third localized haptic feedback 1530 may have amplitudes having different sizes.

The haptic device 1000 according to an embodiment may receive a user input at each of a plurality of positions. The haptic driving unit 1100 of the haptic device 1000 may generate the output vibration 1500 to provide a localized haptic feedback to each of the plurality of positions. The signal controller 1400 of the haptic device 1000 may generate a voltage signal generating the output vibration 1500 for providing a localized haptic feedback to each of the plurality of positions and transmit the voltage signal to the haptic driving unit 1100. Accordingly, the haptic device 1000 may provide localized haptic feedbacks for respective positions in response to multiple tactile output signals. In addition, the haptic device 1000 may independently provide different localized haptic feedbacks at different positions. For example, the haptic device 1000 may provide localized haptic feedbacks having different sizes at different positions.

Figure 14:
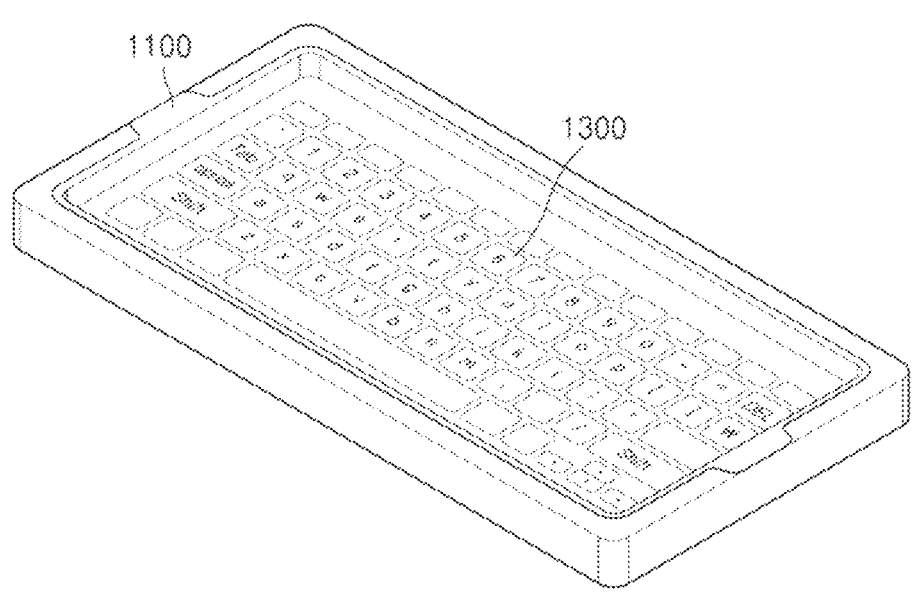
FIG. 14 is a view illustrating a virtual keyboard including a haptic driving unit, according to an embodiment.
Figure 15:
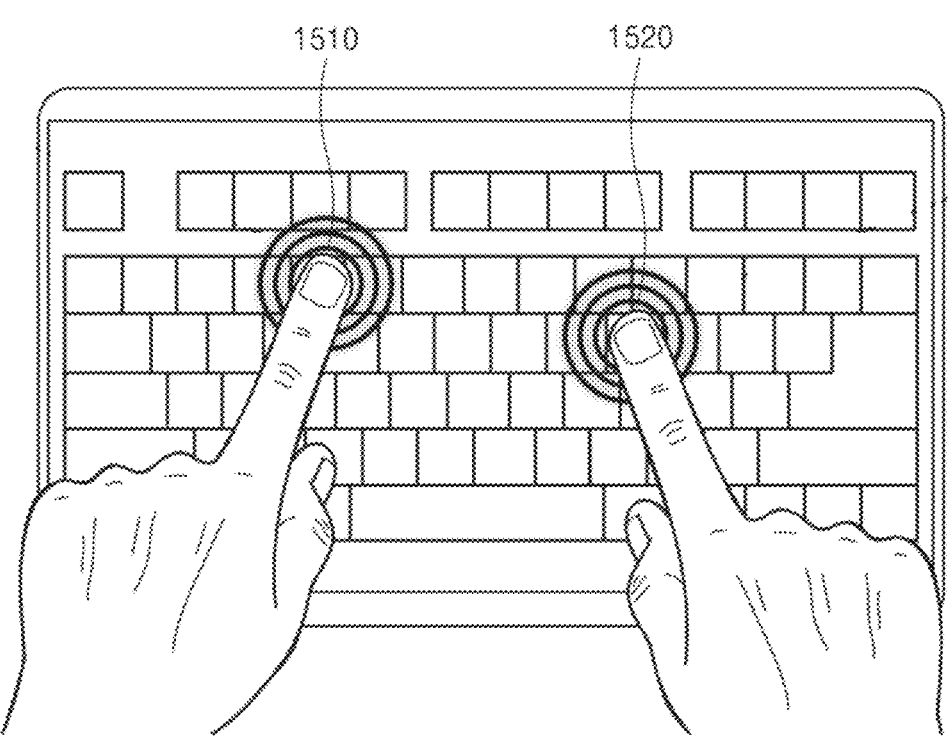
FIG. 15 is a view illustrating that a virtual keyboard provides a plurality of localized haptic feedback, according to an embodiment.

FIG. 14 is a view illustrating a virtual keyboard including a haptic driving unit 1100, according to an embodiment. FIG. 15 is a view illustrating that the virtual keyboard provides a plurality of localized haptic feedbacks 1510 and 1520, according to an embodiment. FIGS. 14 and 15 illustrate that the haptic device 1000 according to an embodiment is the virtual keyboard. The virtual keyboard may include the haptic driving unit 1100 and a touch panel 1300.

In an embodiment, the touch panel 1300 may detect a touch input of a user. The touch panel 1300 may detect, as an input to a key, a user input corresponding to a position of the key displayed on the virtual keyboard. For example, when detecting a user input at a position corresponding to a keyboard key of the alphabet "u" displayed on the virtual keyboard, the touch panel 1300 may detect the user input as an input to the keyboard key of the alphabet "u". For example, when detecting a user input at a position corresponding to the number key "4" displayed on the virtual keyboard, the touch panel 1300 may detect the user input as an input to the number key "4". The touch panel 1300 may acquire information regarding a position at which the user receives a user input on the virtual keyboard. The touch panel 1300 may transmit, to the signal controller 1400, the information regarding the position at which the user input is received.

In an embodiment, the signal controller 1400 may apply, to the haptic driving unit 1100, a voltage signal for providing a plurality of localized haptic feedbacks 1510 and 1520 to a position at which a user input is made on the virtual keyboard. The signal controller 1400 may generate a voltage signal for providing the plurality of localized haptic feedbacks 1510 and 1520 to correspond to the position at which the user input is received on the virtual keyboard. The signal controller 1400 may generate the voltage signal to have a frequency of about 250 Hz included in a frequency band sensitive to a vibrotactile sense of a human body. The signal controller 1400 may generate the voltage signal such that amplitudes of the plurality of localized haptic feedbacks 1510 and 1520 are different from each other, or may generate the voltage signal such that the plurality of localized haptic feedbacks 1510 and 1520 have the same amplitude as each other. The signal controller 1400 may generate the voltage signal to implement a vibration profile that implements a button feeling in the haptic driving unit 1100 by modulating the voltage signal to a frequency of several Hz.

In an embodiment, the haptic driving unit 1100 may provide the plurality of localized haptic feedbacks 1510 and 1520 in response to a user input. For example, the haptic driving unit 1100 may provide a first localized haptic feedback 1510 in response to a user input at a position corresponding to the keyboard key of the alphabet 'u' displayed on the virtual keyboard, and may provide a second localized haptic feedback 1520 in response to a second user input at a position corresponding to the number key "4" displayed on the virtual keyboard. Accordingly, the virtual keyboard including the haptic driving unit 1100 may provide the plurality of localized haptic feedbacks 1510 and 1520 in response to a plurality of user inputs, such that the user may easily recognize positions of keys of the virtual keyboard. Therefore, a typing feeling using the virtual keyboard 1000 may be improved, and an error rate may be reduced when using the virtual keyboard.

Figure 16:
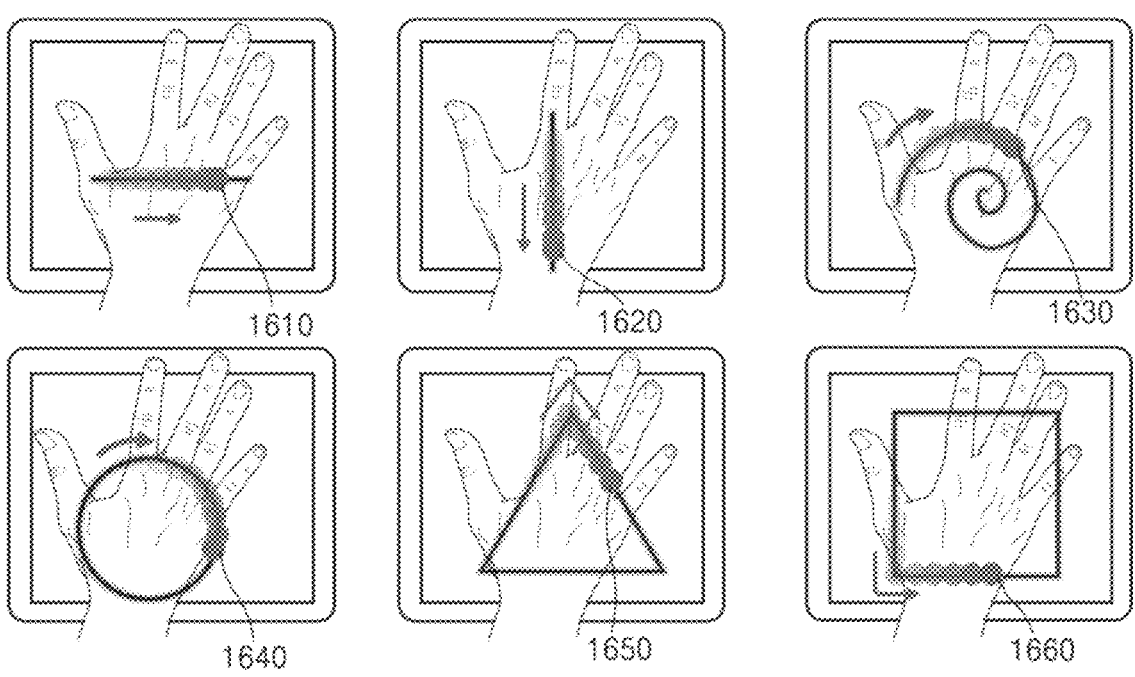
FIG. 16 is a view illustrating that a haptic device provides localized haptic feedback on a drag input, according to an embodiment.

FIG. 16 is a view illustrating that the haptic device 1000 provides localized haptic feedbacks 1610, 1620, 1630, 1640, 1650, and 1660 for a drag input, according to an embodiment.

In an embodiment, the touch panel 1300 of the haptic device 1000 may detect a drag input of a user. The drag input of the user may be a touch input for moving a palm of the user along a particular path while the palm of the user contacts the touch panel 1300. For example, the touch panel 1300 may receive a horizontal drag input, vertical drag input, spiral drag input, circular drag input, triangular drag input, or square drag input of the user. The touch panel 1300 may transmit, to the signal controller 1400, path information regarding a path of a drag input.

In an embodiment, the signal controller 1400 may apply, to the haptic driving unit 1100, a voltage signal for providing the localized haptic feedbacks 1610, 1620, 1630, 1640, 1650, and 1660 along a path of a drag input included in the path information. The haptic driving unit 1100 may provide the localized haptic feedbacks 1610, 1620, 1630, 1640, 1650, and 1660 along the path of the drag input. For example, the haptic driving unit 1100 may provide a horizontal haptic feedback 1610, a vertical haptic feedback 1620, a spiral haptic feedback 1630, a circular haptic feedback 1640, a triangular haptic feedback 1650, or a square haptic feedback 1660.

In an embodiment, the haptic driving unit 1100 may provide the localized haptic feedbacks 1610, 1620, 1630, 1640, 1650, and 1660 that dynamically move along the drag input. The haptic driving unit 1100 may provide the localized haptic feedbacks 1610, 1620, 1630, 1640, 1650, and 1660 to move along a path from a start point to an end point of a drag input. For example, the haptic driving unit 1100 may provide the horizontal haptic feedback 1610 starting at a left drag start point and ending at a right drag point in response to a drag input from left to right. Accordingly, the haptic device 1000 may tactilely provide the user with a pattern or image related to a particular path by providing the localized haptic feedbacks 1610, 1620, 1630, 1640, 1650, and 1660 that dynamically move. For example, the haptic device 1000 may tactilely provide the user with patterns or images related to various alarms and actions by providing the localized haptic feedbacks 1610, 1620, 1630, 1640, 1650, and 1660 that dynamically move.

Figure 17:
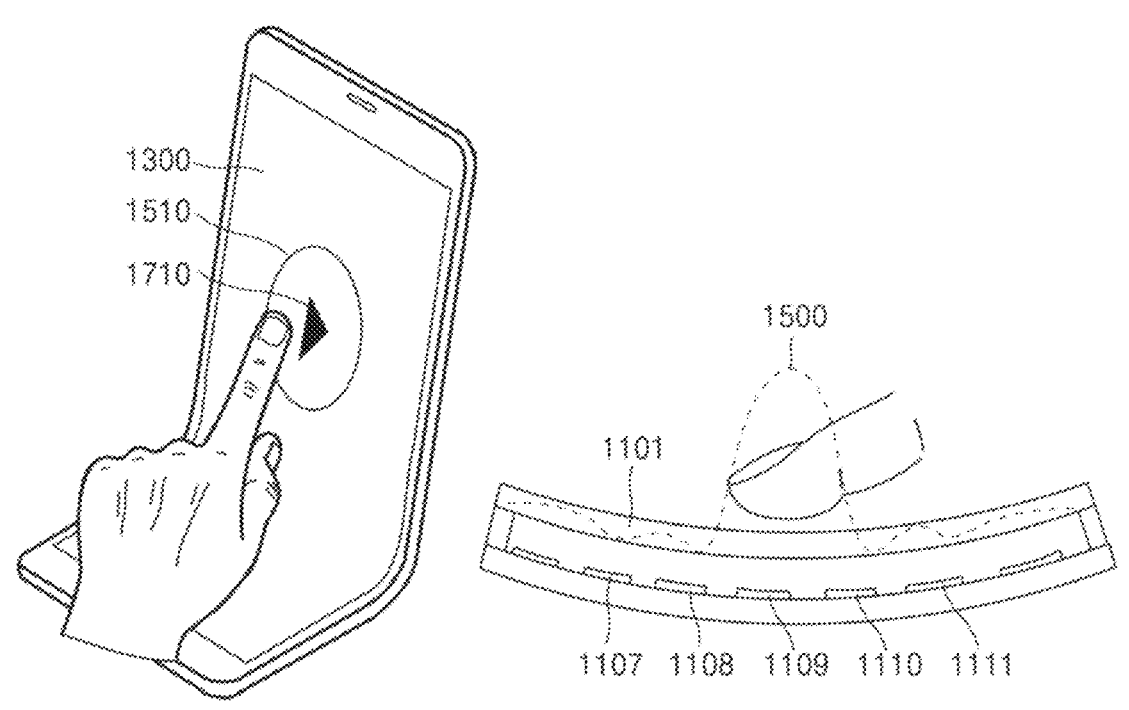
FIG. 17 is a view illustrating that a haptic device provides localized haptic feedback when the haptic device is a flexible device or a foldable device, according to an embodiment.

FIG. 17 is a view illustrating that the haptic device 1000 provides a localized haptic feedback 1510 when the haptic device 1000 is a flexible device or a foldable device, according to an embodiment.

In an embodiment, the haptic driving unit 1100 and the touch panel 1300 of the haptic device 1000 may be bent or folded. The haptic driving unit 1100 and the touch panel 1300 may include a panel and an electrode having flexibility. For example, the first panel 1101, the second panel 1104, and the touch panel 1300 of the haptic driving unit 1100 may include colorless polyimide (CPI) or PET. For example, the common electrode 1106 and the plurality of electrode patterns 1107, 1108, 1109, 1110, and 1111 of the haptic driving unit 1100, and a touch electrode of the touch panel 1300 may include poly(3,4-ethylenedioxythiophene) polystyrene sulfonate (PEDOT:PSS), or silver (Ag) nanowires (Ag-NWs).

In an embodiment, the touch panel 1300 may detect a touch input of a user. For example, the touch panel 1300 may detect a touch of the user on a graphic user interface (GUI) such as an icon 1710 that guides the user to make a touch. The touch panel 1300 may transmit, to the signal controller 1400, information indicating that a touch input occurs on the icon 1710. The signal controller 1400 may apply, to the haptic driving unit 1100, a voltage signal for providing a localized haptic feedback 1510 to a peripheral region in which the icon 1710 is displayed in response to the occurrence of the touch input to the icon 1710. The haptic driving unit 1100 may provide the localized haptic feedback 1510 to the peripheral region in which the icon 1710 is displayed. Accordingly, even when the haptic device 1000 is a flexible device or a foldable device, the haptic device 100 may provide the localized haptic feedback 1510 in a limited partial region, such as the periphery of the icon 1710.

Figure 18:
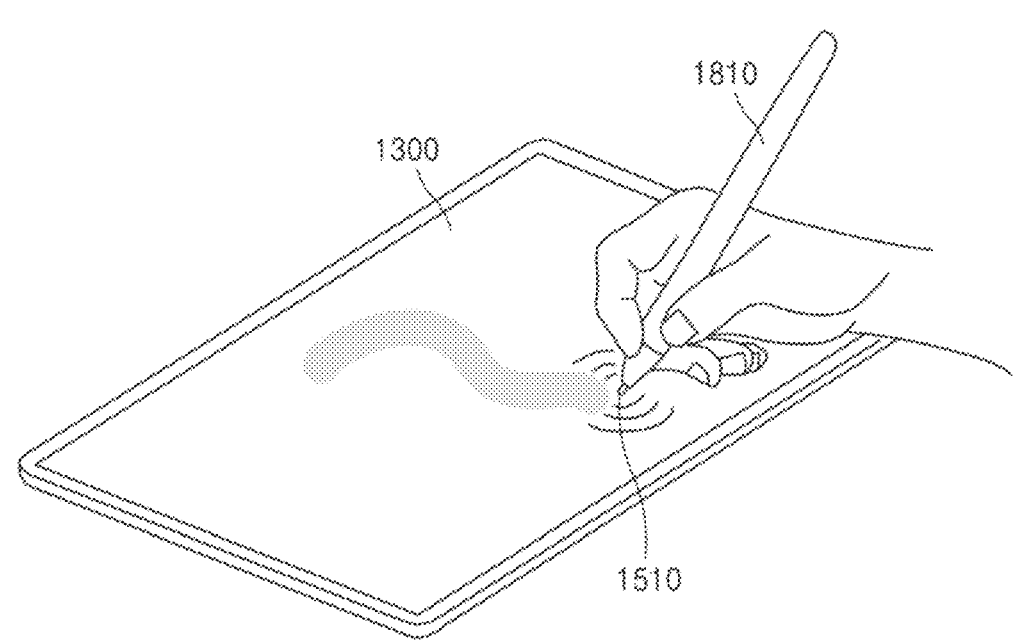
FIG. 18 is a view illustrating that a haptic device provides localized haptic feedback in response to a touch input using an input device, according to an embodiment.

FIG. 18 is a view illustrating that the haptic device 1000 provides a localized haptic feedback 1510 in response to a touch input using an input device 1810, according to an embodiment.

In an embodiment, the haptic device 1000 may detect a user input from the input device 1810. The input device 1810 may be an auxiliary device that performs a touch input on the touch panel 1300 of the haptic device 1000. For example, the input device 1810 may be a touch pen such as a stylus pen. When the input device 1810 is a touch pen, the haptic device 1000 may be a tablet, or a smartphone supporting the touch pen. The touch panel 1300 of the haptic device 1000 may transmit, to the signal controller 1400, information regarding the detected user input.

In an embodiment, the signal controller 1400 may apply, to the haptic driving unit 1100, a voltage signal for providing the localized haptic feedback 1510 corresponding to the user input according to the information. The haptic driving unit 1100 may provide the localized haptic feedback 1510 corresponding to the user input. The localized haptic feedback 1510 provided by the haptic driving unit 1100 may induce a vibration of the input device 1810 by forming a vibration wavelength on the touch panel 1300. Accordingly, the haptic device 1000 may indirectly provide a haptic feedback to a finger of the user by the localized haptic feedback 1510 provided by the haptic driving unit 1100.

In an embodiment, the signal controller 1400 may receive a state of the input device 1810 such as a pen pressure of the input device 1810 or an inclination of the input device 1810. The signal controller 1400 may control a voltage signal to change a frequency, intensity, or position of the localized haptic feedback 1510 at a portion contacting the input device 1810 according to the state of the input device 1810. The haptic driving unit 1100 may provide various vibration profiles to the user by changing the frequency, intensity, or position of the localized haptic feedback 1510 according to the state of the input device 1810.

In an embodiment, the signal controller 1400 may control the voltage signal to change the frequency, intensity, or position of the localized haptic feedback 1510 according to a type of input device 1810. For example, the signal controller 1400 may set the type of input device 1810 to a pencil type, a ballpoint pen type, or a brush type. The signal controller 1400 may apply, to the haptic driving unit 1100, a voltage signal for providing the localized haptic feedback 1510 corresponding to the pencil type, the ballpoint pen type, or the brush type. The haptic driving unit 1100 may provide the localized haptic feedback 1510 by locally outputting a particular vibration profile having a pencil feeling, a ballpoint pen feeling, or a brush feeling. Accordingly, the haptic device 1000 may indirectly provide the user with the pencil feeling, the ballpoint pen feeling, or the brush feeling.

The haptic device 1000 according to an embodiment may include the display 1200 and 1300 including the display panel 1200 and the touch panel 1300, the haptic driving unit 1100 arranged on one surface of the display 1200 and 1300 or inside the display 1200 and 1300, and the signal controller 1400 electrically connected to the haptic driving unit 1100. The haptic driving unit 1100 according to an embodiment may include the first panel 1101, the second panel 1104 arranged to face the first panel 1101, the common electrode 1106 arranged on the first panel 1101, and the plurality of electrode patterns 1107, 1108, 1109, 1110, and 1111 arranged on the second panel 1104. The signal controller 1400 according to an embodiment may generate the output wave 1500 between the first panel 1101 and the second panel 1104 by outputting a voltage signal to the haptic driving unit 1100.

The signal controller 1400 according to an embodiment may provide at least one localized haptic feedback 1510 and 1520 to the touch panel 1300 by controlling at least one of an amplitude and phase of a voltage signal applied to each of the plurality of electrode patterns 1107, 1108, 1109, 1110, and 1111 to overlap, reinforce, or interfere with the output wave 1500.

In an embodiment, the first panel 1101 and the second panel 1104 may have a film-shaped structure. The first panel 1101 and the second panel 1104 according to an embodiment may be detachable from the display 1200 and 1300.

In an embodiment, the first panel 1101 and the second panel 1104 may be transparent and have rigidity that is greater than or equal to a preset value.

In an embodiment, the haptic driving unit 1100 may include the spacer 1102 that is arranged between the first panel 1101 and the second panel 1104 and space the first panel 1101 and the second panel 1104 apart from each other.

In an embodiment, the haptic driving unit 1100 may include the insulating layer 1103 disposed on the upper surface of the second panel 1104.

In an embodiment, the signal controller 1400 may generate an electric field between the common electrode 1106 and the plurality of electrode patterns 1107, 1108, 1109, 1110, and 1111 on the basis of a voltage signal output to each of the plurality of electrode patterns 1107, 1108, 1109, 1110, and 1111. The signal controller 1400 according to an embodiment may generate the output wave 1500 between the first panel 1101 and the second panel 1104 by vibrating the first panel 1101 on the basis of an electrostatic force generated by the electric field.

In an embodiment, the signal controller 1400 may calculate an amplitude and phase of the voltage signal. The signal controller 1400 according to an embodiment may generate an analog waveform corresponding to the amplitude and phase. The signal controller 1400 according to an embodiment may amplify the analog waveform into a voltage signal. The signal controller 1400 according to an embodiment may store parameter data used to calculate the amplitude and phase. The signal controller 1400 according to an embodiment may supply the voltage signal to each of the plurality of electrode patterns 1107, 1108, 1109, 1110, and 1111.

In an embodiment, the signal controller 1400 may select a frequency, position, and intensity of a vibration to be output via the at least one localized haptic feedback 1510 and 1520. The signal controller 1400 according to an embodiment may generate the first wave function 810 that ideally outputs a vibration.

In an embodiment, the signal controller 1400 may calculate the second wave function 820 that includes a plurality of mode shapes obtained by decomposing the first wave function 810 and outputs a target vibration.

In an embodiment, the signal controller 1400 may calculate a function indicating a voltage signal by applying a mathematically assumed pseudo-inverse function solution to the second wave function 820.

In an embodiment, the signal controller 1400 may calculate, on the basis of singular value decomposition, an amplitude and phase of a voltage signal for outputting the second wave function 820.

In an embodiment, the signal controller 1400 may identify whether or not the amplitude of the voltage signal exceeds a threshold value. When the amplitude of the voltage signal exceeds the threshold value, the signal controller 1400 according to an embodiment may limit the amplitude of the voltage signal to the threshold value.

In an embodiment, the at least one localized haptic feedback 1510 and 1520 may include the first localized haptic feedback 1510 providing a first vibration at a first position and the second localized haptic feedback 1520 providing a second vibration at a second position that is different from the first position.

A controlling method of the haptic device 1000, according to an embodiment, may include an operation of generating the output wave 1500 between the first panel 1101 of the haptic driving unit 1100 and the second panel 1104 arranged to face the first panel 1101 by outputting a voltage signal to the haptic driving unit 1100 of the haptic device 1000. The controlling method of the haptic device 1000, according to an embodiment, may include an operation of providing at least one localized haptic feedback 1510 and 1520 to the touch panel 1300 of the haptic device 1000 by controlling at least one of an amplitude and phase of a voltage signal applied to each of the plurality of electrode patterns 1107, 1108, 1109, 1110, and 1111 arranged on the second panel 1104 to overlap, reinforce, or interfere with the output wave 1500.

In an embodiment, the operation of generating the output wave 1500 may include an operation of generating an electric field between the common electrode 1106 arranged on the first panel 1101 and the plurality of electrode patterns 1107, 1108, 1109, 1110, and 1111, on the basis of the voltage signal output to each of the plurality of electrode patterns 1107, 1108, 1109, 1110, and 1111. The operation of generating the output wave 1500, according to an embodiment, may include an operation of generating the output wave 1500 between the first panel 1101 and the second panel 1104 by vibrating the first panel 1101 on the basis of an electrostatic force generated by the electric field.

The controlling method of the haptic device 1000, according to an embodiment, may include an operation of selecting a frequency, position, and intensity of a vibration to be output via the at least one localized haptic feedback 1510 and 1520. The controlling method of the haptic device 1000, according to an embodiment, may include an operation of generating the first wave function 810 that ideally outputs a vibration.

The controlling method of the haptic device 1000, according to an embodiment, may include an operation of calculating the second wave function 820 that includes a plurality of mode shapes obtained by decomposing the first wave function 810 and outputs a target vibration.

The controlling method of the haptic device 1000, according to one embodiment, may include an operation of calculating a function indicating the voltage signal by applying a mathematically assumed pseudo-reverse function solution to the second wave function 820.

The controlling method of the haptic device 1000, according to an embodiment, may include an operation of calculating, on the basis of singular value decomposition, an amplitude and phase of the voltage signal for outputting the second wave function 820.

The controlling method of the haptic device 1000, according to an embodiment, may include an operation of identifying whether or not the amplitude of the voltage signal exceeds a threshold value. The controlling method of the haptic device 1000, according to an embodiment, may include an operation of limiting the amplitude of the voltage signal to the threshold value when the amplitude of the voltage signal exceeds the threshold value.

The method according to an embodiment may be implemented in the form of program instructions that may be performed via various computer means, and may recorded on a computer-readable medium. The computer-readable medium may include program instructions, data files, data structures, and the like alone or in a combination. The program instructions recorded on the medium may be specially designed and configured for the disclosure or may be known to and used by those skilled in computer software. Examples of the computer-readable recording medium include magnetic media such as hard disks, floppy disks, and magnetic tapes, optical media such as CD-ROM and DVD, magneto-optical media such as floptical disks, and hardware devices specially configured to store and execute the program instructions, such as ROM, RAM, and flash memory. Examples of the program instructions include high-level language code that may be executed by a computer by using an interpreter or the like, as well as machine language code such as those generated by a compiler.

Some embodiments may also be implemented in the form of a recording medium including computer-executable instructions, such as a program module executed by a computer. The computer-readable medium may be any available medium that may be accessed by a computer, and include both volatile and nonvolatile media, and detachable and non-detachable media. In addition, the computer-readable medium may include both a computer storage medium and a communication medium. The computer storage medium include both volatile and nonvolatile, detachable and non-detachable media implemented by any method or technology for storing information such as computer-readable instructions, data structures, program modules, or other data. The communication medium typically includes computer-readable instructions, data structures, program modules, or other data in a modulated data signal such as a carrier wave, or other transmission mechanisms, and includes any information delivery media. In addition, some embodiments may also be implemented as computer programs or computer program products that include computer-executable instructions, such as computer programs executed by computers.

A device-readable storage medium may be provided in the form of a non-transitory storage medium. Here, the non-transitory storage medium only means that the non-transitory storage medium is a tangible device and does not include a signal (e.g., electromagnetic waves), and the term does not distinguish between cases in which data is stored semi-permanently and temporarily in the storage medium. For example, the non-transitory storage medium may include a buffer in which data is temporarily stored.

According to an embodiment, a method according to various embodiments described in the disclosure may be included and provided in a computer program product. The computer program product may be traded between a seller and a buyer as a product. The computer program product may be distributed in the form of device-readable storage media (e.g., compact disc only memory (CD-ROM), or may be distributed (e.g., downloaded or uploaded) directly or online between two user devices (e.g., smartphones) via an application store. In the case of online distribution, at least a portion of the computer program product (e.g., a downloadable app) may be at least temporarily stored or temporarily generated in a device-readable storage medium such as a server of a manufacturer, a server of an application store, or a memory of a relay server.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A haptic device comprising:
a display including a display panel and a touch panel;
a haptic driving unit arranged on one surface of the display or inside the display; and
a signal controller electrically connected to the haptic driving unit, wherein the haptic driving unit includes: a first panel; a second panel arranged to face the first panel; a common electrode arranged on the first panel; and a plurality of electrode patterns arranged on the second panel, and the signal controller is configured to generate an output wave between the first panel and the second panel by outputting a voltage signal to the haptic driving unit, and provide at least one localized haptic feedback to the touch panel by controlling at least one of an amplitude and a phase of the voltage signal applied to each of the plurality of electrode patterns to overlap, reinforce, or interfere with the output wave, and
wherein the signal controller is further configured to:
identify whether or not the amplitude of the voltage signal exceeds a threshold value; and limit the amplitude of the voltage signal to the threshold value when the amplitude of the voltage signal exceeds the threshold value.

2. The haptic device of claim 1, wherein the first panel and the second panel each have a film-shaped structure and are detachable from the display.

3. The haptic device of claim 1, wherein the first panel and the second panel are transparent, and each have rigidity that is greater than or equal to a preset value.

4. The haptic device of claim 1, wherein the haptic driving unit further includes a spacer arranged between the first panel and the second panel to space the first panel and the second panel apart from each other.

5. The haptic device of claim 1, wherein the haptic driving unit further includes an insulating layer arranged on an upper surface of the second panel.

6. The haptic device of claim 1, wherein the signal controller is configured to: generate an electric field between the common electrode and the plurality of electrode patterns on the basis of the voltage signal output to each of the plurality of electrode patterns; and generate the output wave between the first panel and the second panel by vibrating the first panel on the basis of an electrostatic force generated by the electric field.

7. The haptic device of claim 1, wherein the signal controller is configured to: calculate the amplitude and the phase of the voltage signal; generate an analog waveform corresponding to the amplitude and the phase; amplify the analog waveform into the voltage signal; store parameter data used to calculate the amplitude and the phase; and supply the voltage signal to each of the plurality of electrode patterns.

8. The haptic device of claim 1, wherein the signal controller is configured to: select a frequency, a position, and an intensity of a vibration to be output via the at least one localized haptic feedback; and generate a first wave function that ideally outputs the vibration.

9. The haptic device of claim 8, wherein the signal controller is further configured to calculate a second wave function including a plurality of mode shapes obtained by decomposing the first wave function and outputting a target vibration.

10. The haptic device of claim 9, wherein the signal controller is further configured to calculate a function indicating the voltage signal by applying a mathematically assumed pseudo-inverse function solution to the second wave function.

11. The haptic device of claim 10, wherein the signal controller is further configured to calculate, on the basis of singular value decomposition, the amplitude and the phase of the voltage signal for outputting the second wave function.

12. The haptic device of claim 1, wherein the at least one localized haptic feedback includes a first localized haptic feedback providing a first vibration at a first position and a second localized haptic feedback providing a second vibration at a second position that is different from the first position.

13. A controlling method of a haptic device, the controlling method comprising:
an operation of generating an output wave between a first panel of a haptic driving unit and a second panel arranged to face the first panel by outputting a voltage signal to the haptic driving unit of the haptic device;
an operation of providing at least one localized haptic feedback to a touch panel of the haptic device by controlling at least one of an amplitude and a phase of the voltage signal applied to each of a plurality of electrode patterns arranged on the second panel to overlap, reinforce, or interfere with the output wave,
an operation of identifying whether or not the amplitude of the voltage signal exceeds a threshold value; and
an operation of limiting the amplitude of the voltage signal to the threshold value when the amplitude of the voltage signal exceeds the threshold value.

14. The controlling method of claim 13, wherein the operation of generating the output wave includes:
an operation of generating an electric field between a common electrode arranged on the first panel and the plurality of electrode patterns, on the basis of the voltage signal output to each of the plurality of electrode patterns; and
an operation of generating the output wave between the first panel and the second panel by vibrating the first panel on the basis of an electrostatic force generated by the electric field.

15. The controlling method of claim 13, further comprising:
an operation of selecting a frequency, a position, and an intensity of a vibration to be output via the at least one localized haptic feedback; and
an operation of generating a first wave function that ideally outputs the vibration.

16. The controlling method of claim 15, further comprising an operation of calculating a second wave function including a plurality of mode shapes obtained by decomposing the first wave function and outputting a target vibration.

17. The controlling method of claim 16, further comprising an operation of calculating a function indicating the voltage signal by applying a mathematically assumed pseudo-inverse function solution to the second wave function.

18. The controlling method of claim 17, further comprising an operation of calculating, on the basis of singular value decomposition, the amplitude and the phase of the voltage signal for outputting the second wave function.

* * * * *